United States Patent [19]

Morimoto et al.

[11] Patent Number: 5,297,027
[45] Date of Patent: Mar. 22, 1994

[54] METHOD OF AND APPARATUS FOR PROMOTING THE UNDERSTANDING OF A TEXT BY USING AN ABSTRACT OF THAT TEXT

[75] Inventors: Yasutsugu Morimoto, Kawasaki; Fumiyuki Yamano, Yokohama, both of Japan

[73] Assignee: Hitachi, Ltd., Tokyo, Japan

[21] Appl. No.: 696,365

[22] Filed: May 6, 1991

[30] Foreign Application Priority Data

May 11, 1990 [JP] Japan .................................. 2-122411

[51] Int. Cl.$^5$ ............................................. G06F 15/40
[52] U.S. Cl. ................................................ 364/419.19
[58] Field of Search .......................................... 364/419

[56] References Cited

U.S. PATENT DOCUMENTS

| 4,358,824 | 11/1982 | Glickman et al. | 364/419 |
| 4,641,264 | 2/1987 | Nitta et al. | |
| 4,985,863 | 1/1991 | Fujisawa et al. | 364/419 |
| 5,077,668 | 12/1991 | Doi | 364/419 |
| 5,099,426 | 3/1992 | Carlgren et al. | 364/419 |
| 5,153,831 | 10/1992 | Yianilos | 364/419 |

FOREIGN PATENT DOCUMENTS

| 58-40684 | 3/1983 | Japan . |
| 61-117658 | 6/1986 | Japan . |
| 1-214969 | 8/1989 | Japan . |
| 1-320567 | 12/1989 | Japan . |
| 2-112068 | 4/1990 | Japan . |

OTHER PUBLICATIONS

"Operation II Introduction to Language Data Processing for Study of Humanities", Asakura Nihongo Shin Koza (Asakura Japanese Language Series) No. 6, published from Asakura Shoten Co., Ltd., 1983. (Provided in Japanese).

Primary Examiner—Robert A. Weinhardt
Attorney, Agent, or Firm—Fay, Sharpe, Beall, Fagan, Minnich & McKee

[57] ABSTRACT

A method and an apparatus for extracting text information for use with a computer system including an input unit, an output unit, and a storage is described. The storage is loaded with documents, abstracts thereof, and relational information indicating relationships between a sentence of the abstracts and sentences of the documents. In response to a selection instruction from the input unit, a sentence is selected from the abstracts such that the documents are accessed so as to extract therefrom, based on the relational information, sentences associated with the selected abstract sentence. Information related to the associated sentences thus extracted is outputted to the output unit. According to the method and the apparatus, text information such as important portions of a document and a list of words appearing in the important portions can be easily obtained by use of the abstracts.

17 Claims, 33 Drawing Sheets

FIG. 2

DOCUMENT MANAGEMENT
INFORMATION TABLE

61

| SENTENCE NUMBER | PARAGRAPH NUMBER |
|---|---|
| B 1 | D 1 |
| B 2 | D 1 |
| B 3 | D 1 |
| B 4 | D 2 |
| ⋮ | ⋮ |

WORD TABLE 406

| SENTENCE NUMBER | WORDS | | | |
|---|---|---|---|---|
| B 1 | Japan | role | in | ... |
| B 2 | This | movement | have | ... |
| B 3 | The | number | of | ... |
| B 4 | it | be | very | ... |
| ⋮ | ⋮ | ⋮ | ⋮ | |

DOCUMENT 60

| SENTENCE NUMBER | ENGLISH SENTENCE DATA |
|---|---|
| B 1 | Japan's role in the world has expanded dramatically. |
| B 2 | This movement has necessitated translation of ··· |
| B 3 | The number of translators in the labor market ··· |
| B 4 | It is very ··· |

ABSTRACT GENERATION PROCESSING

FIG. 7

STOP WORD FILE

7

| SPECIFICATION METHOD LABEL | STOP WORD |
|---|---|
| 0 | Preposition |
| 0 | Article |
| 1 | be |
| 1 | have |
| ⋮ | ⋮ |

FIG. 6

WORD FREQUENCY TABLE

407

| WORD | FREQUENCY |
|---|---|
| translation | 4 |
| HICATS | 3 |
| document | 2 |
| system | 2 |
| ⋮ | ⋮ |

FIG. 8

SENTENCE SCORE TABLE

408

| SENTENCE NO. | IMPORTANT WORD COUNT | WORD COUNT | SCORE |
|---|---|---|---|
| B1 | 0 | 8 | 0 |
| B2 | 2 | 11 | 0.182 |
| B3 | 0 | 14 | 0 |
| B4 | 1 | 14 | 0.071 |
| ⋮ | ⋮ | ⋮ | ⋮ |

FIG. 9

ABSTRACT SENTENCE TABLE

409

| ABSTRACT SENTENCE NO. | SENTENCE NO. |
|---|---|
| A1 | B2 |
| A2 | B5 |
| A3 | B7 |
| ⋮ | ⋮ |

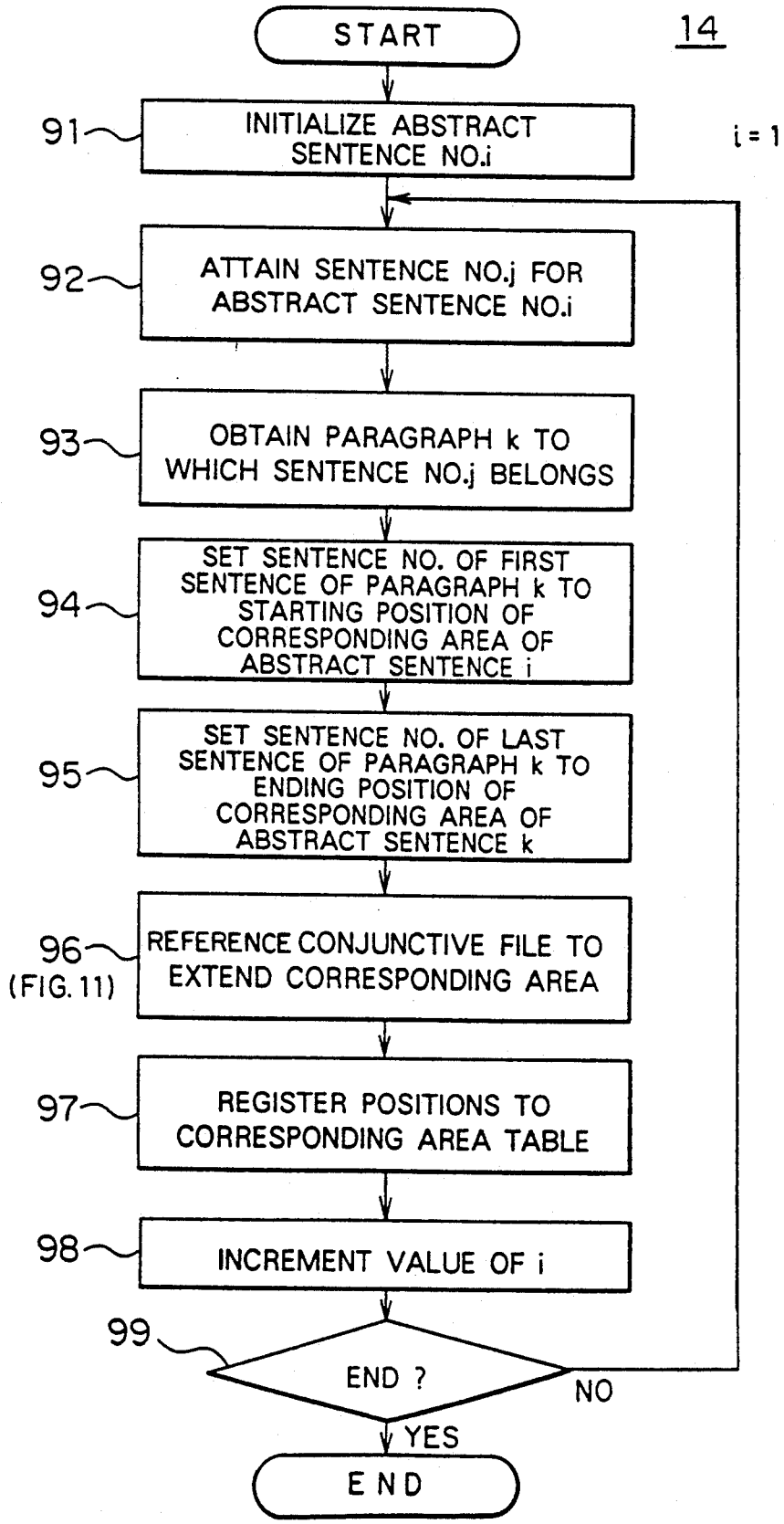

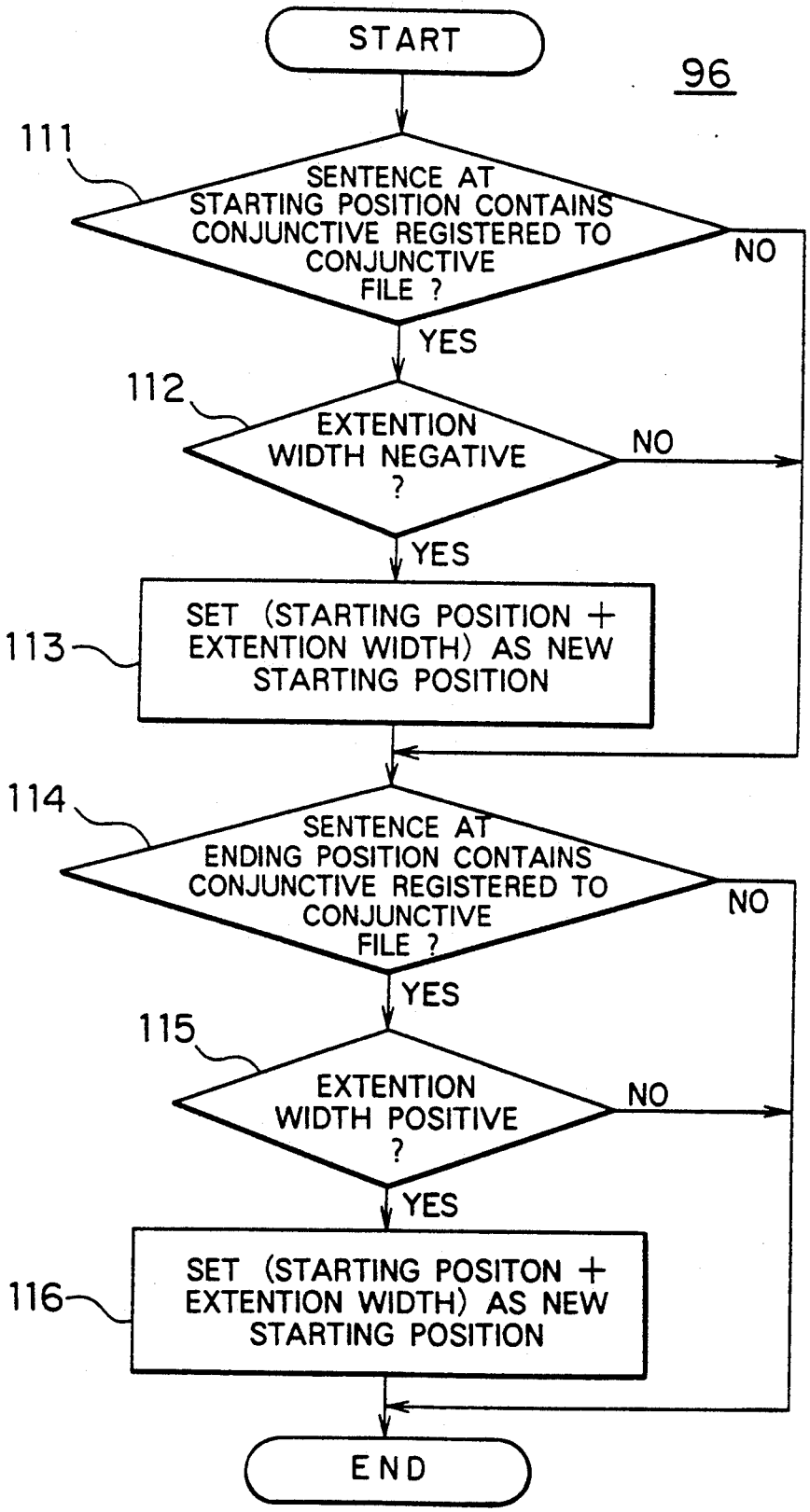

FIG. 12 CONJUNCTIVE FILE

8

| CONJUNCTIVE | EXTENTION WIDTH |
|---|---|
| but | −1 |
| however | −1 |
| as follows | +1 |
| therefore | −1 |
| ⋮ | ⋮ |

FIG. 13 CORRESPONDING AREA TABLE

410

| ABSTRACT SENTENCE NO. | CORRESPONDING AREA STARTING POSITION | CORRESPONDING AREA ENDING POSITION |
|---|---|---|
| A 1 | B 1 | B 3 |
| A 2 | B 4 | B 6 |
| A 3 | B 6 | B 7 |
| ⋮ | ⋮ | ⋮ |

FIG. 14

DISPLAY

A1: This movement has necessitated translation of a large number of documents.

A2: Hitachi's Machine Translation System (HICATS) is a system aimed at just this problem.

A3: Moreover, HICATS can reduce the cost of translation, too.

•
•
•

TEXT INFORMATION EXTRACTION AND DISPLAY PROCESSING

FIG. 21

DISPLAY WORD TABLE  411

| DISPLAY WORD | FREQUENCY |
|---|---|
| HICATS | 2 |
| system | 2 |
| translation | 2 |
| ⋮ | ⋮ |

FIG. 23

KEYWORD TABLE
412

| KEYWORD |
|---|
| HICATS |
| translation |
| cost |
| ⋮ |

FIG. 24A

Sentences inclvding the word HICATS.

B5: Hitachi's Machine Translation System (HICATS)
is a system aimed at just this problem.

B6: HICATS can increase the capacity of translation.

FIG. 24B

Sentences inclvding the word HICATS.

B4: It is very difficult to translate all the documents that need to be translated.

B5: Hitachi's Machine Translation System (HICATS) is a system aimed at just this problem.

B6: HICATS can increase the capacity of translation.

DIFFERENT DOCUMENT RETRIEVAL PROCESSING

FIG. 29A

DOCUMENT

60

| SEN-TENCE NO. | ENGLISH SENTENCE DATA |
|---|---|
| B1 | Japan's role in ··· |
| B2 | This movement ··· |
| B3 | The number of ··· |
| ⋮ | ⋮ |

FIG. 29B

JAPANESE DOCUMENT FILM

5

| SEN-TENCE NO. | JAPANESE SENTENCE DATA |
|---|---|
| B1 | |
| B2 | Kono ugoki wa takusan no·· |
| B3 | |
| ⋮ | ⋮ |

FIG. 32

DISPLAY WORD TABLE

2411

| ENGLISH WORD | TRANSLATED WORD | FREQUENCY |
|---|---|---|
| difficult | Muzukashii | 1 |
| translate | Honyaku suru | 2 |
| document | Dokyumento | 2 |
| ⋮ | ⋮ | ⋮ |

FIG. 30A

A1: This movement has necessitated translation of a large number of documents.

A2: Hitachi's Machine Translation System (HICATS) is a system aimed at just this problem.

A3: Moreover, HICATS can reduce the cost of translation, too.

A1: KONO UGOKI WA TAKUSAN NO BUNSHO NO HONYAKU WO HITSUYŌ TO SHITA.

A2: HITACHI NO KIKAI HONYAKU SHISUTEMU (HICATS) WA, MASANI KONO MONDAI NI MUKERARERU SHISUTEMU DE ARU.

A3: SONOUE, MATA, HICATS WA HONYAKU NO HIYŌ WO SAGERU KOTO GA DEKIRU.

⋮

TEXT INFORMATION EXTRACTION AND DISPLAY PROCESSIING

FIG. 33A

```
#4: HONYAKU SARERU HITSUYŌ GA ARU BUNSHO WO SUBETE
    HONYAKU SURU KOTO WA TAIHEN MUZUKASHII.
#5: HITACHI NO KIKAI HONYAKU SHISUTEMU (HICATS) WA,
    MASANI, KONO MONDAI NI MUKERARERU SHISUTEMU DE
    ARU.
#6: HICATS WA HONYAKU NO KYAPASHITII WO MASUKOTO
    GA DEKIRU.
```

FIG. 33B

| | |
|---|---|
| A1: KONO UGOKI WA TAKUSAN NO BUNSHO NO HONYAKU WO HITSUYO TO SHITA. | #4: HONYAKU SARERU HITSUYŌ GA ARU BUNSHO WO SUBETE HONYAKU SURU ··· |
| A2: HITACHI NO KIKAI HONYAKU SHISUTEMU (HICATS) WA MASANI KONO ··· | #5: HITACHI NO KIKAI HONYAKU SHISUTEMU (HICATS) WA MASANI KONO ··· |
| A3: SONOUE, MATA, HICATS WA HONYAKU NO HIYŌ WO SAGERU KOTO ··· | #6: HICATS WA HONYAKU NO KYAPASHITII WO MASUKOTO GA DEKIRU. |

WORD LIST DISPLAY PROCESSING

KEYWORD SETTING PROCESSING

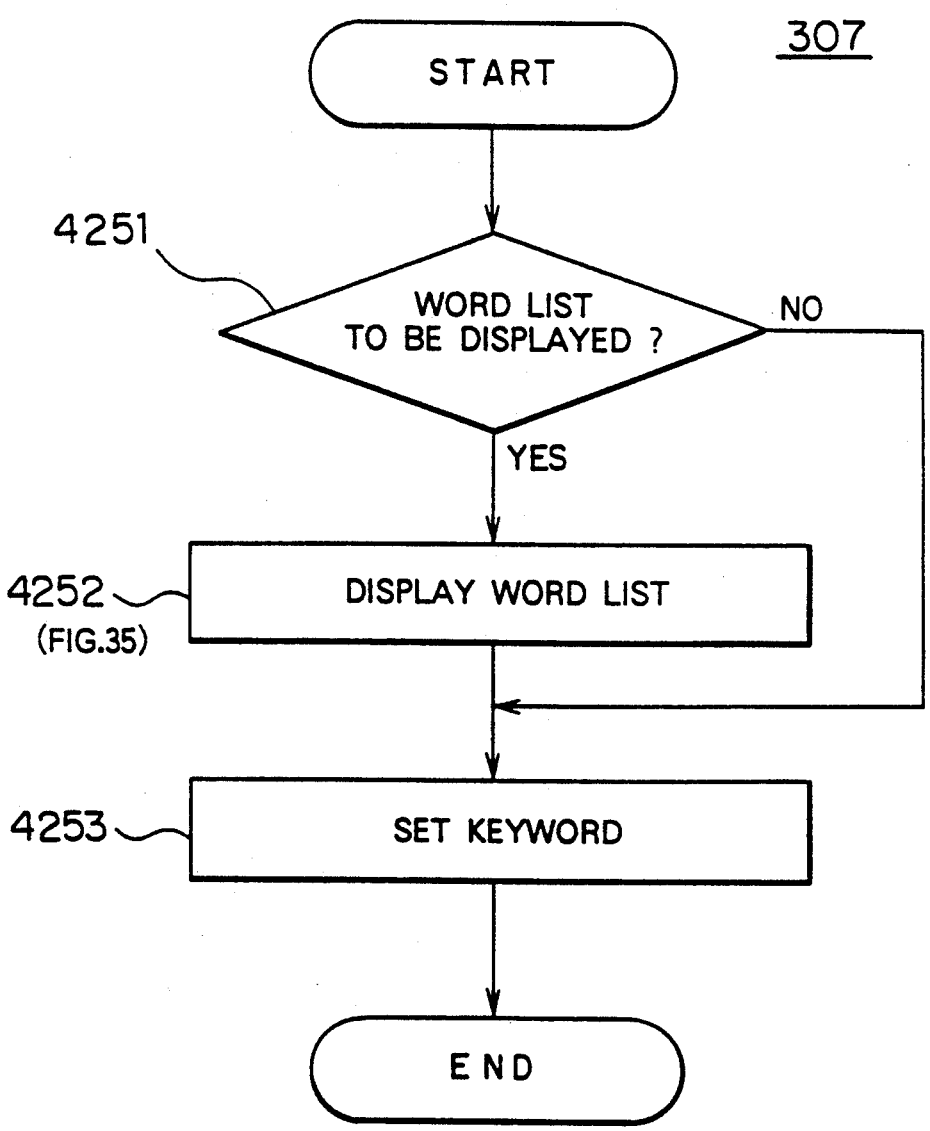

METHOD OF AND APPARATUS FOR PROMOTING THE UNDERSTANDING OF A TEXT BY USING AN ABSTRACT OF THAT TEXT

BACKGROUND OF THE INVENTION

1. Field of the Invention

The present invention relates to a method of and an apparatus for extracting text information, and in particular, to a method of and an apparatus for extracting text information in which text information related to a document can be easily obtained by use of an abstract of the document.

2. Description of the Prior Art

Heretofore, when it is desired to attain text information such as important portions of a document or a list of words appearing in the important portions, people read the texts of the document to extract essential parts; thereafter, the extracted portions are respectively inputted as a document to an apparatus for automatically extracting a list of words from the document, thereby producing a word list.

Moreover, in the prior art, in a case where a person desires to refer original document sentences while reading abstracts, the reader is required to find out the corresponding portions of the original document.

However, the method above has been attended with a problem, namely, the operations to read the document to extract important portions thereof and such portions corresponding to the abstracts take a considerably long period of time.

SUMMARY OF THE INVENTION

It is therefore an object of the present invention to provide a method of extracting text information capable of easily obtaining text information such as essential parts of a document or a list of words in the important portions.

Another object of the present invention is to provide a method of extracting text information in which corresponding portions of original documents can be easily referenced from abstracts of the documents.

Another object of the present invention is to provide an apparatus for extracting text information in which the method of extracting text information is suitably implemented.

In order to achieve the object above, there is provided according to the present invention a method of extracting text information comprising a memorizing step of memorizing a document, an abstract thereof, and relational information denoting relationships between sentences of the document and a sentence of the abstract, an abstract sentence choosing step of choosing at least a sentence from the abstract, a corresponding sentence extracting step of extracting from the document sentences corresponding to the sentence chosen from the abstract based on the relational information, and a text information output step of attaining and for outputting text information related to the extracted corresponding sentences.

In addition, according to the present invention there is provided an apparatus for extracting text information comprising memorize means for memorizing a document, an abstract thereof, and relational information denoting relationships between sentences of the document and a sentence of the abstract, abstract output means for outputting the abstract stored in said memory means, abstract sentence choose means operated by a user for choosing at least a sentence from the abstract thus outputted by said abstract output means, corresponding sentence extract means for extracting from the document sentences corresponding to the sentence chosen from the abstract based on the relational information, and text information output means for attaining and for outputting text information related to the extracted corresponding sentences.

In accordance with a method of and an apparatus for extracting text information according to the present invention, relational information designating relationships between sentences of a document and a sentence of an abstract of the document (abstract sentence) is memorized such that when a user chooses an abstract sentence, sentences of the original document are obtained depending on the relational information to output text information such as the sentences of the original document and a list of words used in the sentences.

Consequently, the provision above facilitates the user to gather such information as important portions of a document and a list of words appearing therein.

Moreover, when a user reads an abstract of a document, sentences of the original document of the abstract can be easily referenced.

BRIEF DESCRIPTION OF THE DRAWINGS

The objects and features of the invention will best be understood from a detailed description of a preferred embodiment thereof, selected for purposes of illustration and shown in the accompanying drawings, in which:

FIG. 2 is a conceptual diagram illustratively showing the structure of an document management information table;

FIG. 6 is a schematic diagram conceptually showing the constitution of a word frequency table;

FIG. 7 is a conceptual diagram showing the layout of a stop word file;

FIG. 8 is a diagram illustratively showing the configuration of a sentence score table;

FIG. 9 is a diagram showing the constitution of an abstract sentence table;

FIG. 10 is a flowchart showing the operation of an example of a determination processing of the corresponding area in the original document;

FIG. 11 is a flowchart showing the operation of the extention of the corresponding area;

FIG. 12 is a diagram showing the constitution of a conjunctive file;

FIG. 13 is a diagram schematically showing the layout of a corresponding area table;

FIG. 14 is a diagram showing a display screen example;

FIG. 21 is a diagram conceptually showing a display word table;

FIG. 23 is a conceptual diagram showing the configuration of a keyword table;

FIGS. 24A and 24B are diagrams showing display screen examples;

FIGS. 29A and 29B are diagrams conceptually showing contents of an English document and a Japanese DOCUMENT file, respectively;

FIGS. 30A and 30B are diagrams showing display screen examples;

FIG. 32 is a diagram conceptually showing a display word table;

FIGS. 33A and 33B are diagrams illustratively showing screen display examples;

FIG. 39 is a flowchart showing the operation of an alternative document retrieval processing.

DESCRIPTION OF THE PREFERRED EMBODIMENTS

Figure 1:
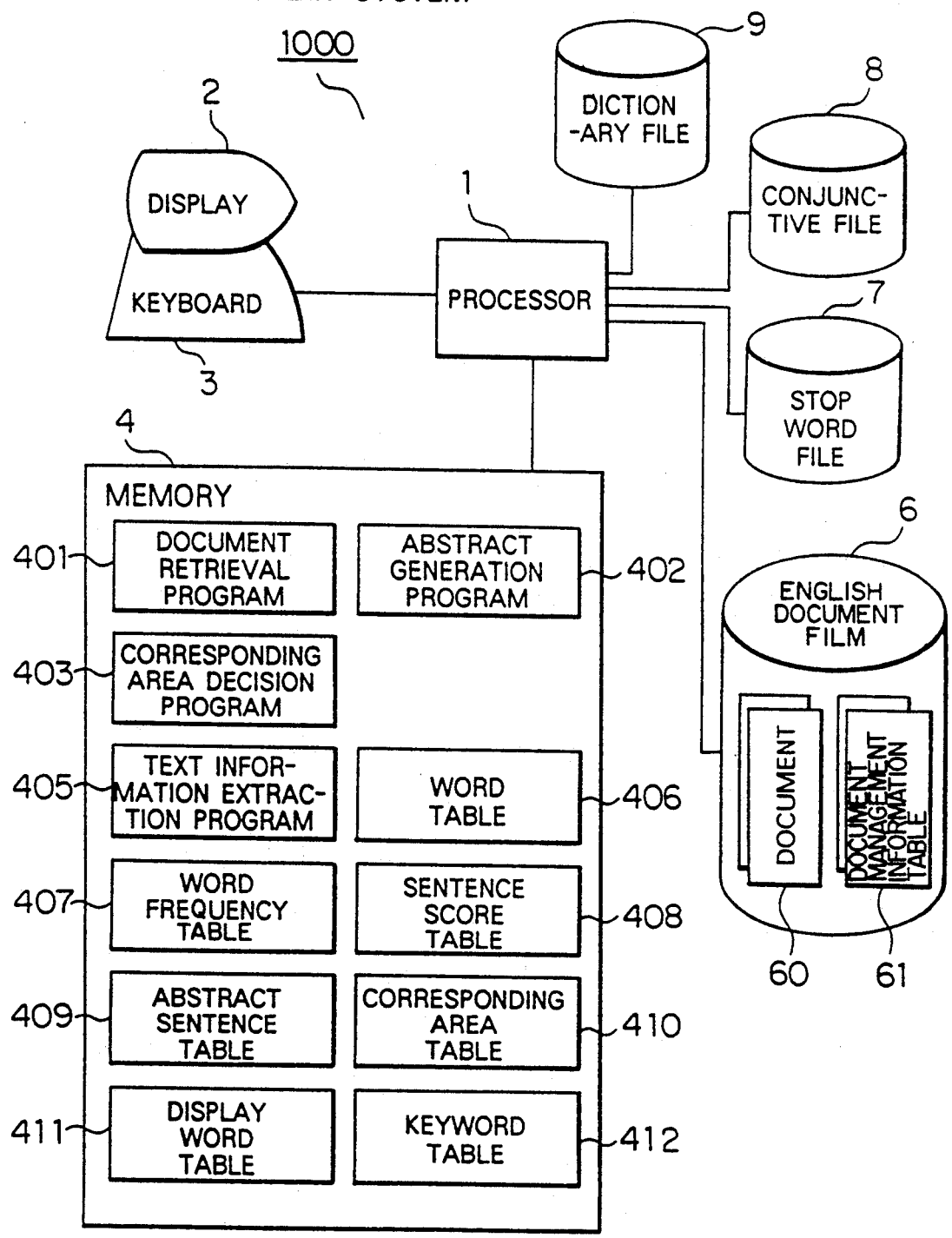
FIG. 1 is a hardware block diagram of a first embodiment according to the present invention.

Referring now to the drawings, description will be given of embodiments according to the present invention. It is to be understood, however, that the present invention is not restricted by the embodiments.

FIG. 1 is a block diagram showing the functional configuration of a text retrieval and display system 1000 in a first embodiment according to the present invention.

The structure of FIG. 1 includes a processor 1, a display 2, a keyboard 3, a memory 4, an English document file 6, a stop word file 7, a conjunctive file 8, and a dictionary file 9.

The memory 4 is disposed to store therein a document retrieval program 401, an abstract generation program 402, a corresponding area decision program 403, a text information extraction program 405, a word table 406, a word frequency table 407, a sentence score table 408, an abstract sentence table 409, a corresponding area table 410, a display word table 411, and a keyword table 412.

The English document file 6 is loaded with at least one English document 60 and a document management information table 61 for each document. The document management information table 61 is used as shown in FIG. 2 to store therein, for each sentence of the associated document, a sentence number assigned thereto and a paragraph number of paragraph containing the sentence.

Figure 3:
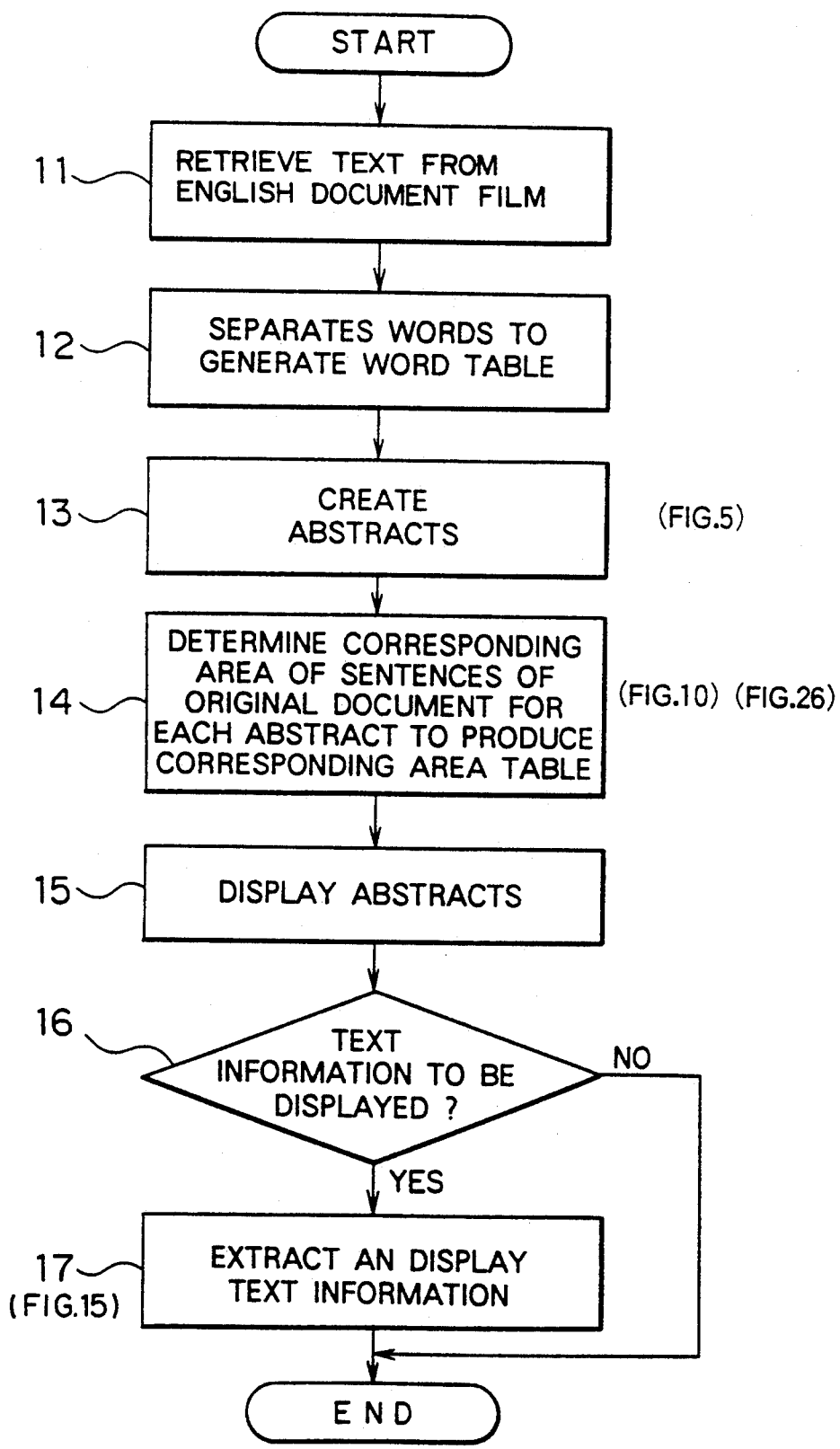
FIG. 3 is a basic flowchart showing the processing of a first embodiment according to the present invention.

FIG. 3 shows a flowchart of processing in which the text retrieval and display system 1000 retrieves a document from the English document file 6 to generate and to display an abstract thereof; moreover, original sentences corresponding to the abstract are extracted from the English document file 6 to be presented on the display 2.

In this flowchart, a step 11 retrieves a text from the English document file 6 according to a known retrieval method adopted in a text data base retrieval system and the like (for example, when a retrieval key is inputted, the system compares the inputted key with document keys beforehand assigned to related documents to extract documents for which the comparison results in a matching state).

Figure 4:
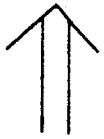
FIG. 4 is a diagram conceptually showing a word table including words used in a document.

In a step 12, a morphological analysis is accomplished on each sentence of the obtained document such that words constituting the sentence are stored in the word table 406 according to an order in which the words appear in the sentence. That is, as shown in FIG. 4, each sentence of the document 60 is disassembled into words to be loaded in the word table 406 in the appearing order thereof. For example, a sentence or statement "Japan's role in the world ... " with a sentence number B1 in the document 60 is processed to select therefrom such words as "Japan", "role", "in", etc. in the appearing order so as to store the words in a row having the sentence number B1 in the word table 406. For this analysis, there may be employed a morphological analysis method which has been described, for example, in the JP-A-58-40684.

A step 13 produces an abstract of the obtained document.

Figure 5:
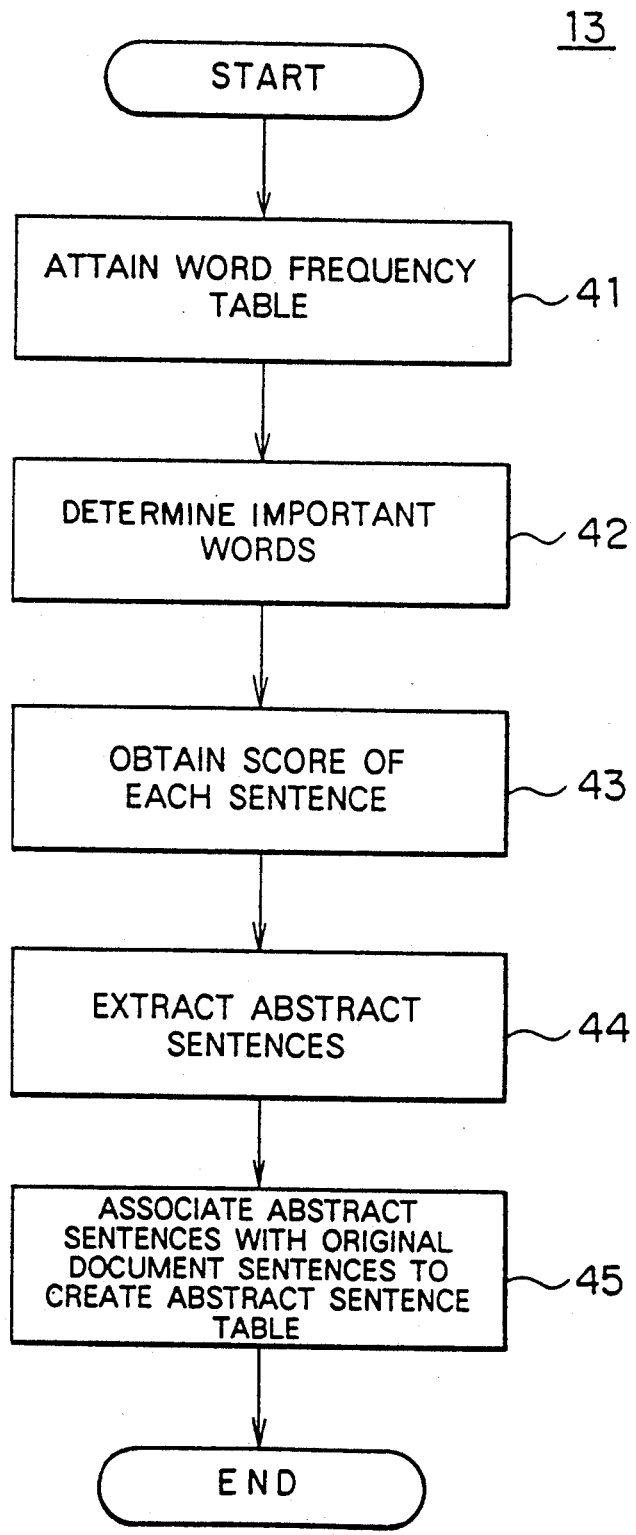
FIG. 5 is a flowchart showing the operation of an abstract generation processing.

FIG. 5 shows an example of the abstract generation processing.

First, a step 41 computes, for each word in the document, a utilization frequency of the word to be stored in the word frequency table 407. Namely, this table 407 contains entries each including a word appearing in the document and a frequency the number of appearances thereof. However, the frequency is not attained for a word specified (as a stop word) in the stop word file 7 as shown in FIG. 7. In this connection, the specification of a stop word in the stop word file 7 is accomplished in either one of two methods i.e. a specification by a part of speech such as a preposition or an article and a specification by a word such as "be", or "have". In order to discriminate between these specifications, for the former case, a specification method label field is load with "0"; whereas, for the latter specification, the label field is set to "1".

A step 42 chooses important words i.e. words each having a frequency not less than a preset value. Moreover, if a retrieval key has been adopted in the step 11 for the document retrieval, the retrieval key is also chosen as an important word.

In a step 43, for each sentence, the number of important words thus chosen is divided by the number of words of the sentence to obtain a score of the sentence, which is loaded in the sentence score table 408 as shown in FIG. 8.

A step 44 extracts a predetermined number of sentences in a descending order of the respective scores to store the sentence number of chosen sentences (to be called abstract sentences) in an appearing order thereof in the sentence number field of abstract table 409 (FIG. 9).

As an alternative method of generating the abstracts, there may be used e.g. a method in which first sentences of respective paragraphs are collected from a document to be arranged in this order as an abstract of the document. This method seems to be quite simple and is hence useful when the system requires only a brief abstract for each document. Moreover, there may be adopted a method described, for example, in pages 2 to 4 of "Operation II Introduction to Language Data Processing for Study of Humanities", Asakura Nihongo Shin Koza (Asakura Japanese Language Series) No. 6 published from Asakura Shoten Co., Ltd. in 1983. Furthermore, a method described in the JP-A-61-117658 may also be applicable to the operation above.

A step 45 sequentially assigns abstract sentence numbers to the respective abstract sentences to produce the abstract sentence table 409 of FIG. 9 containing the abstract sentence numbers and the associated original sentence numbers with correspondences established therebetween.

Returning now to FIG. 3, a step 14 determines for each abstract sentence an area of sentences in the original document corresponding to the abstract sentence, thereby accomplishing the corresponding area determination processing.

Referring to the flowchart of FIG. 10, a description will be given of the corresponding area determination processing.

In this flowchart, a step 91 initializes an abstract sentence number i (Ai) to "1" (A1).

A step 92 then accesses the abstract sentence table 409 of FIG. 9 to obtain an original sentence number j (bj) associated with the abstract sentence number i (Ai). For i=1 (A₁), this step 92 obtains j=2 (B₂).

A step 93 conducts a search operation through the document management information table 61 to attain a paragraph number k (Dk) of a paragraph to which the statement number j (Bj) belongs. For j=2 (B₂), this step 93 results in k=1 (Dk).

In a step 94, from the document management information table, a sentence number of a first sentence of the paragraph designated by the paragraph number k (Dk) is obtained to be set as a first position of the area of sentences in the original document associated with the abstract sentence having the abstract sentence number i (Ai).

A step 95 attains a sentence number of a last sentence of the paragraph having the paragraph number k (DK) from the document management information table 61 to assign the sentence number as a last position of the area of sentences in the original document corresponding to the abstract sentence having the abstract sentence number i (Ai).

A step 96 extends the area of sentences associated with the abstract sentence with the abstract sentence number i (Ai), thereby achieving the corresponding area extention processing.

A description will now be given of the corresponding area extention processing by referring to the flowchart of FIG. 11.

A step 111 first checks to determine whether or not the sentence at the first position includes a conjunctive registered in the conjunctive file 8. If this is the case, control proceeds to a step 112; otherwise, control is passed to a step 114.

The connective file 8 is disposed to store therein, as shown in FIG. 12, entries each including a conjunctive (a conjunction or a word/phrase equivalent thereto) and a width of the extention of the corresponding sentence area based on a property of the conjunctive. For example, this file 8 contains as an entry comprising a conjunctive "but" and an extention width "−1" associated therewith. This means that if the sentence at the first position contains a conjunctive "but", it is necessary to read the document beginning from a sentence preceding the pertinent sentence.

A step 112 checks to decide whether or not the value of the extention width is positive. If the value is negative, control passes to a step 113; otherwise, control transfers to a step 114.

In the step 113, a value attaining from "Start position+Extention width" is set as a new start position. For example, when the sentence at the start position includes a conjunctive "but", the sentence just prior to it becomes a new start position.

The step 114, the sentence at th last position is checked to determine whether or not this sentence contains a conjunctive registered to the conjunctive file 8. If this is the case, the processing proceeds to a step 115; otherwise, the system terminates the corresponding area extention processing.

The step 115 checks to determine whether or not the value of the extention width is positive. If this is the case, control is passed to a step 116; otherwise, the corresponding area extention processing is terminated.

In a step 116, a value resultant from "Last position+Extention width" is set to a new last position. For example, when the sentence at the last position contains a conjucntive "as follows", the sentence just posterior to it becomes a new start position. Thereafter, the system terminates the corresponding area extention processing.

Returning now to FIG. 10, a step 97 registers a pair of the abstract sentence and its corresponding area to the corresponding area table 410 as shown in FIG. 13.

A step 98 increments the value of the abstract sentence number i.

Step 99 checks to determine whether or not a position of the resultant abstract sentence number i exceeds the last item of the abstract sentence table 409. If the last item is not exceeded, the processing returns to the step 92; otherwise, the system terminates the corresponding area extention processing 96.

Returning again to FIG. 3, a step 15 displays the abstracts. FIG. 14 shows display screen examples.

A step 16 checks to decide whether or not the user has made a selection for a display of a text information. In this is the case, control is passed to a step 17; otherwise, the processing is terminated.

A step 17 extracts and then displays the text information.

Referring now to the flowchart of FIG. 15, a description will be given of the text information extraction and display processing 17.

In a step 151, the user selects from the displayed abstracts an abstract sentence to obtain text information related thereto.

A step 152 accesses the corresponding area table 410 of FIG. 13 to obtain an area of sentences corresponding to the selected abstract sentence. These areas are respectively set as processing areas.

In a step 153, the user selects a processing mode. The user may select any one of the processing modes including an original sentence display processing, a keyword retrieval processing, a different document retrieval processing, an abstract sentence selection processing and a termination. In response to the user's selection, control is transferred to either one of the steps 154 to 157 or the text information extraction and display processing is terminated.

A step 154 conducts the original sentence display processing. Referring now to the word frequency table 407 of FIG. 6, the original sentence display processing will be described.

In a step 161, the user specifies whether or not a contrastive display of abstract sentences and sentences in the processing areas is to be achieved. If these sentences are desired to be presented on the display 2 in a contrastive fashion, control is transferred to a step 162; otherwise, the processing proceeds to a step 165.

The step 162 subdivides the screen area of the display 2 into two parts including a left-half portion and a right-half portion.

Figure 17:
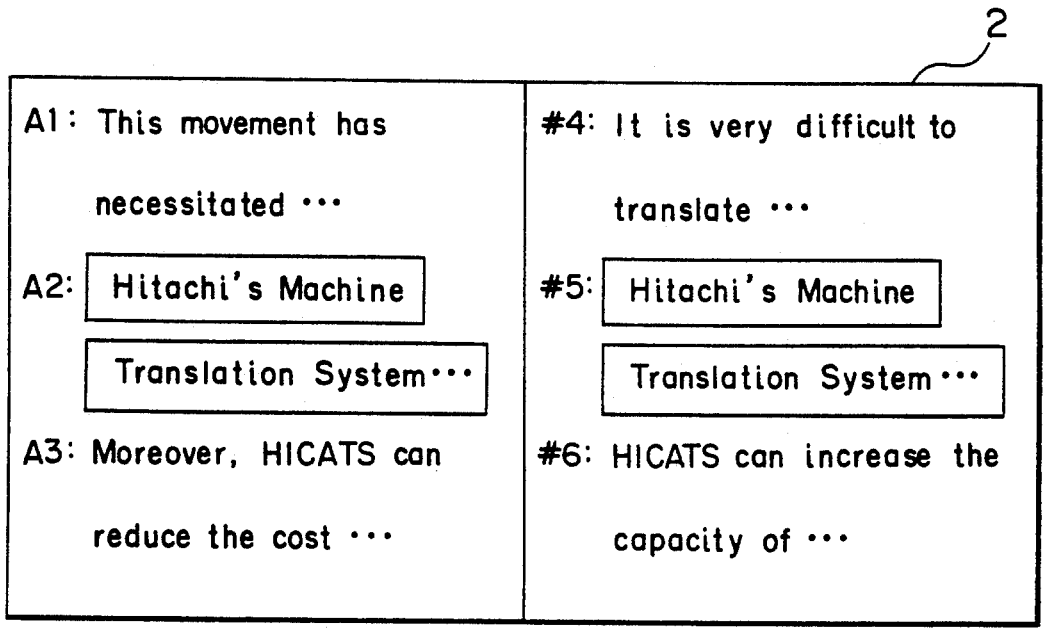
FIGS. 17 and 18 are diagrams showing examples of the display screen.

A step 163 displays in the screen area of the left-hand side a portion of abstracts containing the abstract sentences selected by the user in the step 151 of FIG. 5. In this operation, the selected abstract sentences are displayed at positions near the central row of the left-half area. Moreover, the selected abstract sentences are displayed with a higher brightness, in a different color, and/or the like to be clearly discriminated from other sentences. In addition, the English document file 6 is accessed so as to read from the document 60 the sentences in the processing areas associated with the abstract sentences selected by the user. The obtained sentences are then displayed in the screen area on the right-hand side. The sentences in the documents corresponding to the selected abstract sentences are displayed, for example, with a higher brightness and/or in a different color to be clearly discriminated from other sentences. Furthermore, the sentences in the documents corresponding to the selected abstract sentences are displayed at positions near the central row of the right-half screen area. FIG. 17 shows an example of the screen developed in this operation. In the screen image of FIG. 17, the abstract sentences chosen by the user and the sentences of the texts in the processing areas corresponding thereto are respectively enclosed in quadrilateral frames. Each portion in the frame is discriminatorily presented with a higher brightness, in a different color, and/or the like to be clearly identified.

Figure 18:
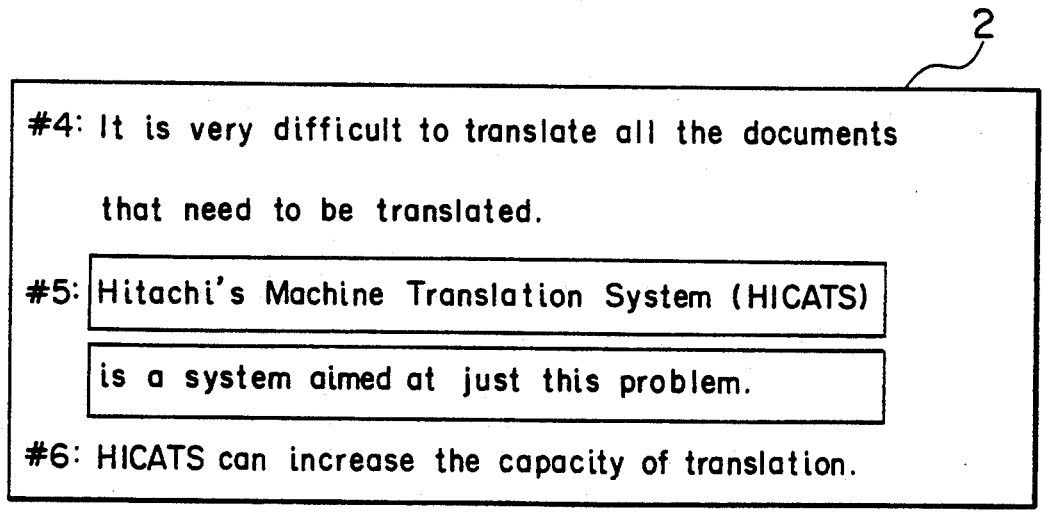

On the other hand, the step 165 accesses the English document file 6 to read from the document 60 the sentences in the processing areas so as to present the attained sentences on the screen of the display 2. In this operation, the text sentences corresponding to the abstract sentences selected by the user are displayed at positions near the center of the screen. Moreover, these sentences are presented e.g. with a higher brightness to be discriminated from the other display items. FIG. 18 shows an example of the screen image obtained in this operation.

In a step 167, the user judges for appropriateness of the area of sentences displayed in association with the abstract sentences thus selected by the user. If the area is acceptable, the user specifies an input for the acceptance, namely, the area is not to be changed; otherwise, a area change request is inputted. In the former case, the original sentence display processing 154 is terminated. For a sentence change specification, control is passed to a step 168.

The step 168 changes the first and last positions of a processing area based on an instruction supplied from the user. In the processing area change operation, the system changes the starting and ending positions of the corresponding area in the corresponding area table 410 according to the user's instruction. Control is then passed again to the step 161.

Returning to FIG. 15, a step 155 carries out the keyword retrieval processing. With reference to the flowchart of FIG. 19, a description will be given of the keyword retrieval processing.

In a step 191, the user chooses whether or not a word list is to be displayed so that the user references the contents thereof as candidates for keywords. If the word list is to be displayed, control is transferred to a step 192; otherwise, the processing proceeds to a step 193.

The step 192 presents the word list on the display 2. The word list display processing will be described with reference to the flowchart of FIG. 20.

In a step 201, the user selects a type of the word list to be displayed; thereafter, the user specifies a class of the word list. Two kinds of word lists are specifiable in this system, namely, a word list ordered by frequency of words and a word list ordered in alphabetical sequence.

A step 202 searches the word table 406 of FIG. 4 to attain words appearing in the sentences existing in the processing area and then stores the words in the display word table 411 of FIG. 21. In this operation, however, the stop words registered in the stop word file 7 are not stored in the table 411. Moreover, at this point of time, the frequency field of each word is set to an initial value "1" in the display word table 411.

A step 203 counts the number of words repeatedly found in the display word table 4 to delete unnecessary records each including the word such that the table 411 contains only one record including the word. Thereafter, the frequency of the record is replaced with the counted value.

A step 204 checks to decide whether or not a word list ordered by frequency has been requested in the step 201. If this is the case, control is passed to a step 205; otherwise, control is transferred to a step 206.

The step 205 sorts the records of the display word table 411 in the frequency order.

The step 206 sorts the records of the display word table 411 in the alphabetical order.

Figure 22A:
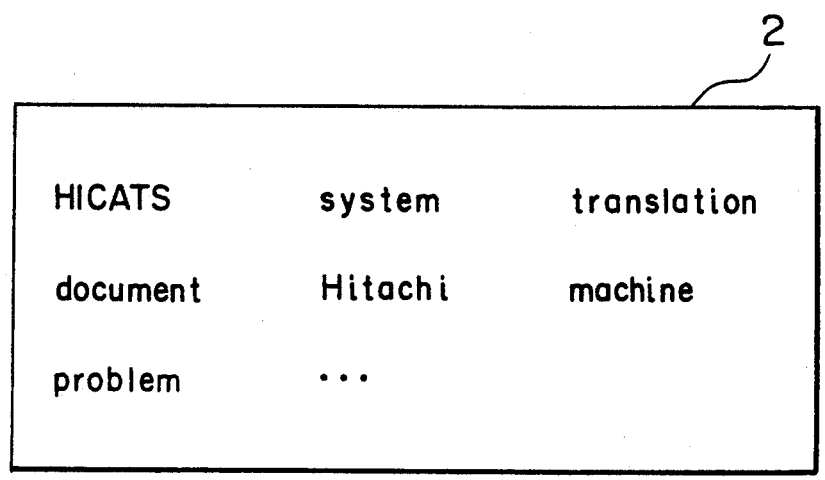
FIGS. 22A and 22B are diagrams showing display screen examples.
Figure 22B:
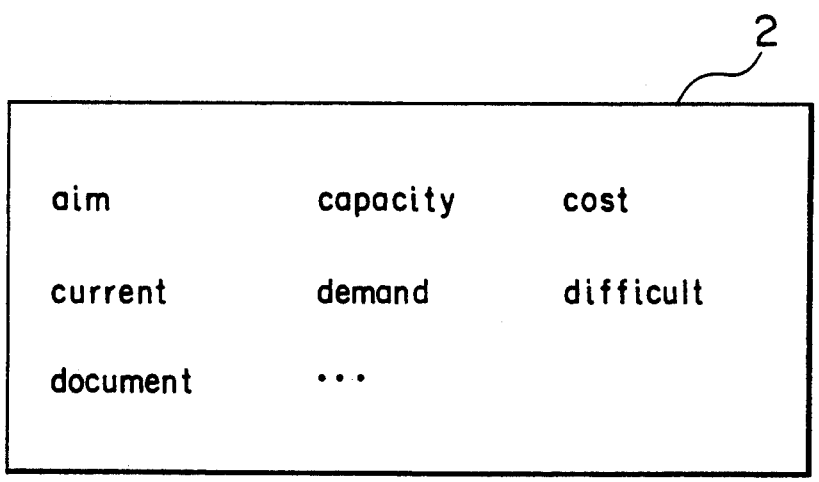

A step 207 presents the display word table 411 in the form of a list. FIGS. 22A and 22B respectively show examples of the word list ordered by frequency and that sorted in the alphabetical order.

Returning now to FIG. 19, a step 193 allows the user to input a keyword. In this input operation, the user may select a word from the word list presented in the step 192 as a keyword or may input a keyword from the keyboard 3. Furthermore, a plurality of keywords may be inputted. When two or more keywords are inputted, the processing need only be repeatedly executed. The inputted keyword is stored in the keyword table 412 of FIG. 23.

A step 194 extracts, from the sentences of the processing area, sentences each including the keyword stored in the keyword table 412. A sentence number of the sentence including the keyword can be obtained from the word table 406.

A step 195 accesses the English document file 6 to acquire from the document 60 sentences each including the keyword and then presents the sentences on the display 2. In this operation, only the sentences each including the keyword may be displayed as shown in FIG. 24A or the sentences of the processing area may be displayed such that the sentences each including the keyword area, for example, blinked for clear identification thereof as shown in FIG. 24B.

Figure 15:
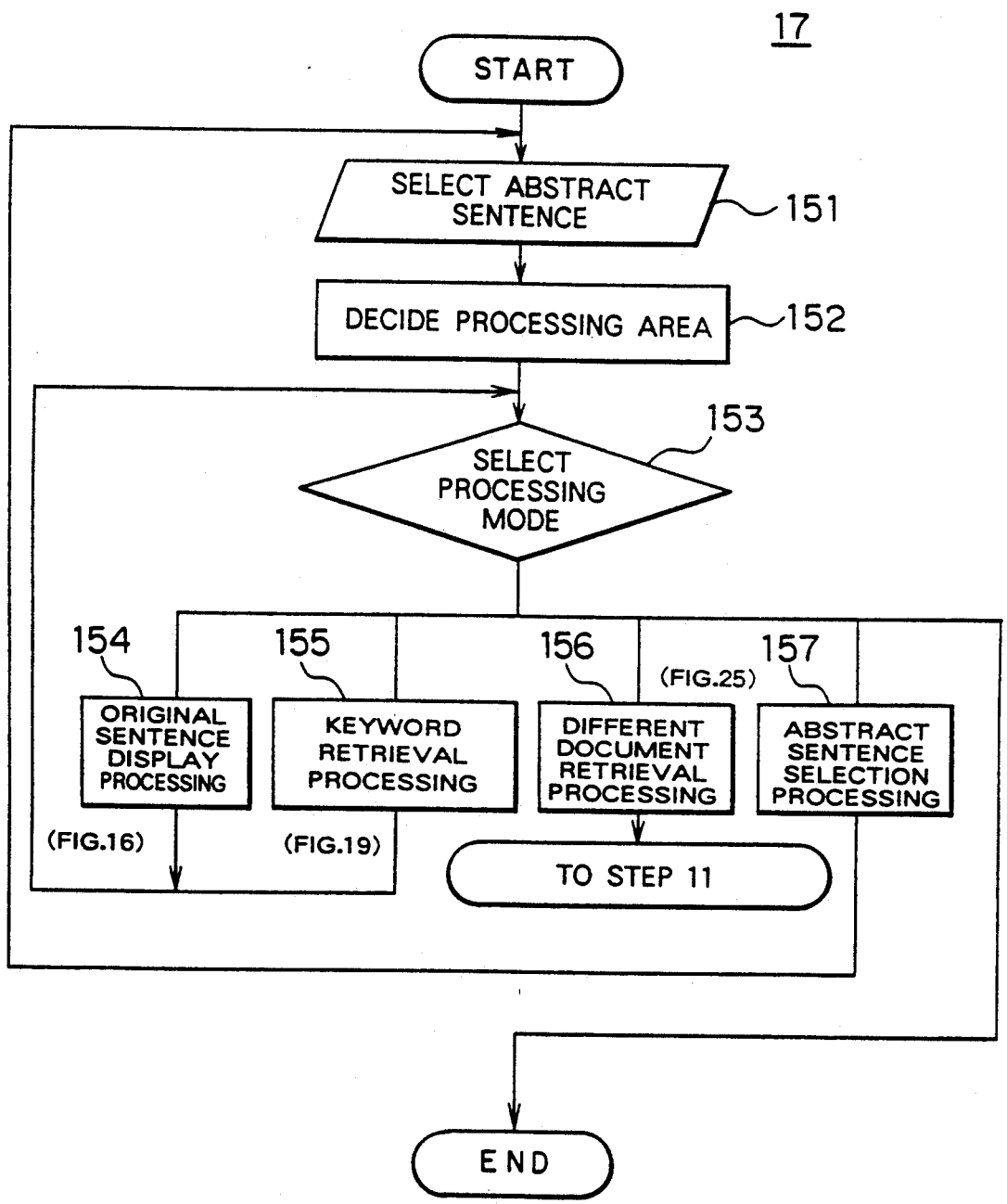
FIG. 15 is a flowchart showing the operation of the text information extraction and display processing.

In a step 196, the user judges for appropriateness of the processing area corresponding to the abstract sentences selected by the user in the step 151 of FIG. 15. If the processing area is appropriate, the user inputs an indication that the processing area is not to be changed; otherwise, a processing area change is specified. In the former case, the keyword retrieval processing is terminated. For the processing area change, control is passed to step 197.

The step 197 changes the starting and ending positions of the processing area depending on an instruction supplied from the user. In response to the processing area change, the starting and ending positions of the corresponding area are updated in the corresponding area table 410 of FIG. 13. Control is then passed again to the step 194.

Figure 25:
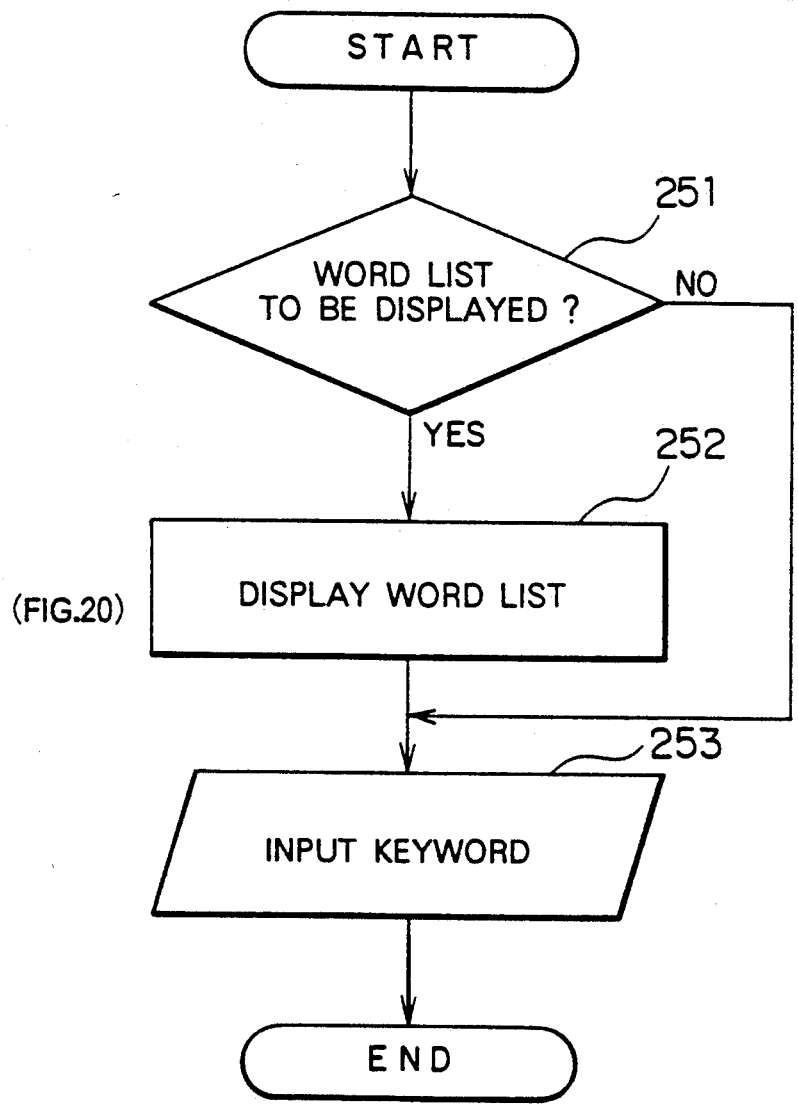
FIG. 25 is a flowchart showing the operation of another document retrieval processing.

Returning to FIG. 15, a step 156 accomplishes the different document retrieval processing. With references to the flowchart of FIG. 25, the different document retrieval processing will be described.

In a step 251, the user chooses an instruction to display a word list so that the user references the word list as candidates for keywords. If the word list is to be displayed, control is passed to a step 252; otherwise, control is transferred to a step 253. This step 251 is identical to the step 191 of FIG. 19.

Figure 19:
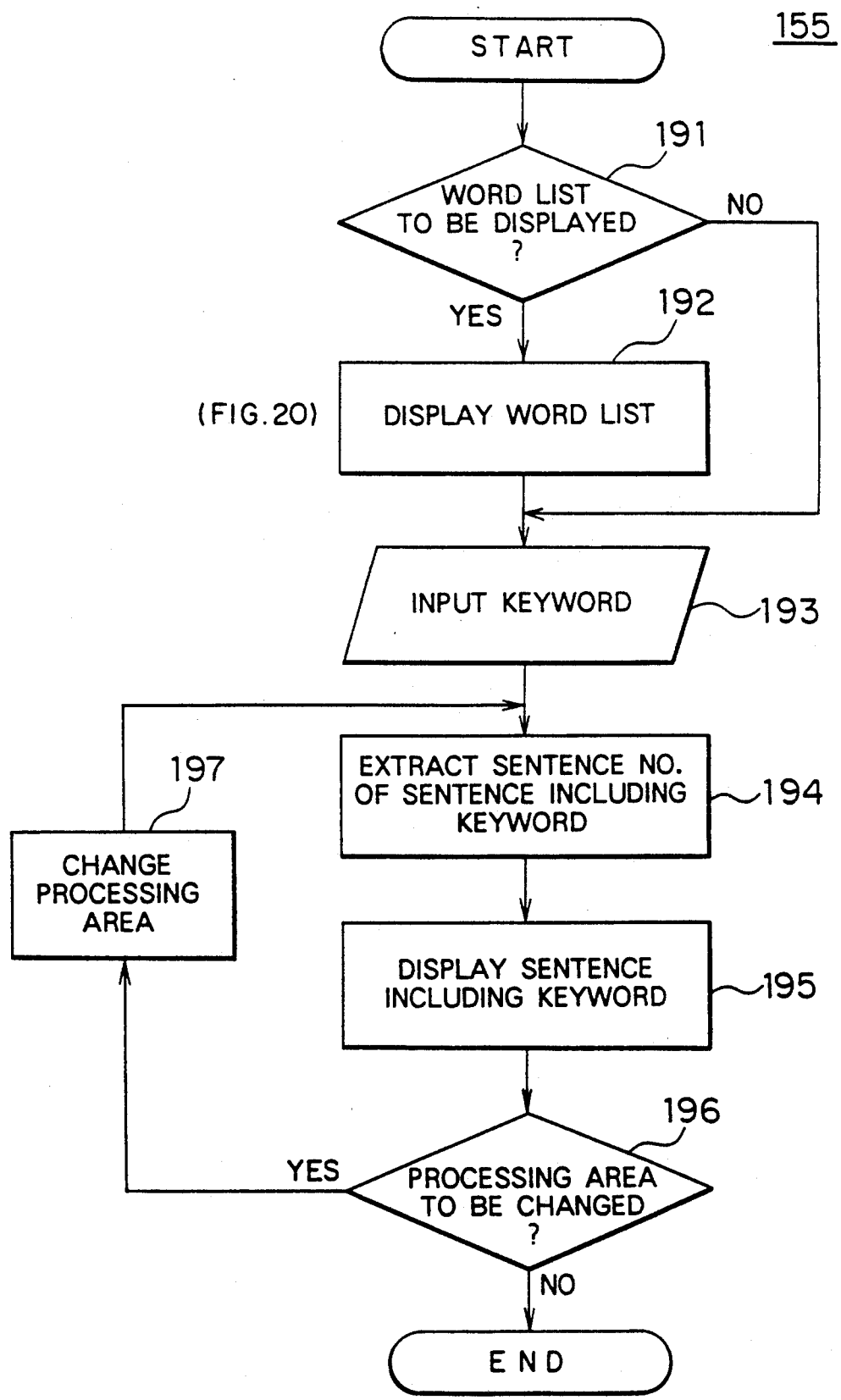
FIG. 19 is a flowchart showing the operation of a keyword retrieval processing.
Figure 20:
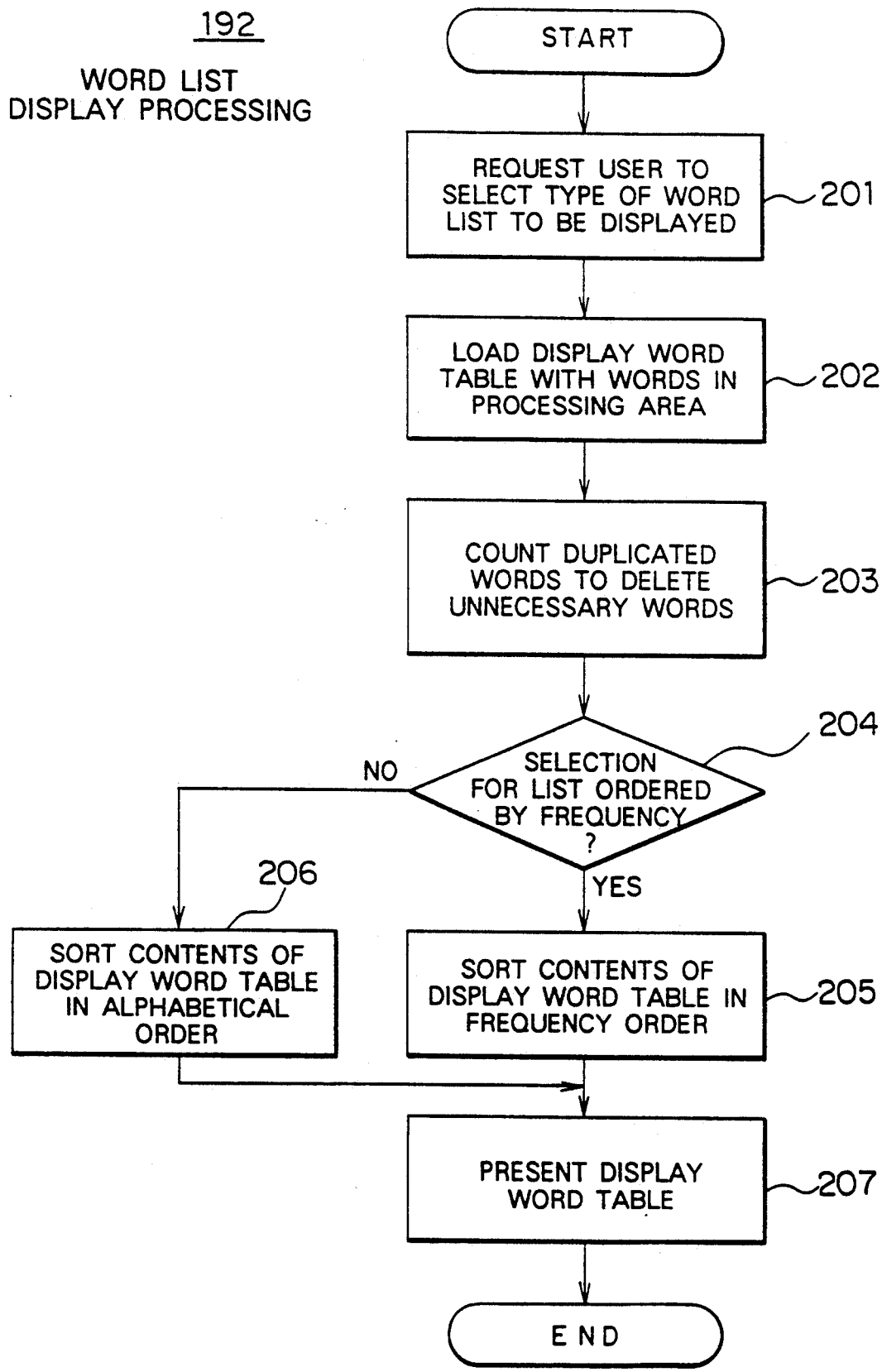
FIG. 20 is a flowchart showing the operation of a word list display processing.

A step 252 displays the word list, which is accomplished in a similar fashion to the processing of the step 192 of FIG. 19. More concretely, FIG. 20 shows processing to be achieved in the step 252.

In a step 253, the user inputs a keyword. This step is almost the same as the step 193 of FIG. 19.

Thereafter, returning to the flowchart of FIG. 15, control is then transferred to the step 11 of FIG. 3. Namely, a retrieval is conducted for a different document with a word of the keyword table 412 set as a retrieval key. Moreover, a sequence of processing from the step 12 to the step 17 is executed recursively.

With the provision of the different document retrieval processing, it is possible, while extracting text information from a document, to associatively retrieve another document related thereto. That is, the user can set as a retrieval key a word in a document or a word associatively desired by the user while reading a document so as to retrieve another document associatively.

Returning now to FIG. 15, the step 157 of the abstract sentence selection processing displays abstracts and then control is passed again to the step 151.

In the description above, the document management information table 61 of the English document file 6 includes information about paragraphs of the documents. In an alternative embodiment, which will now be described, the paragraph information is not included in the document management information table 61.

Figure 26:
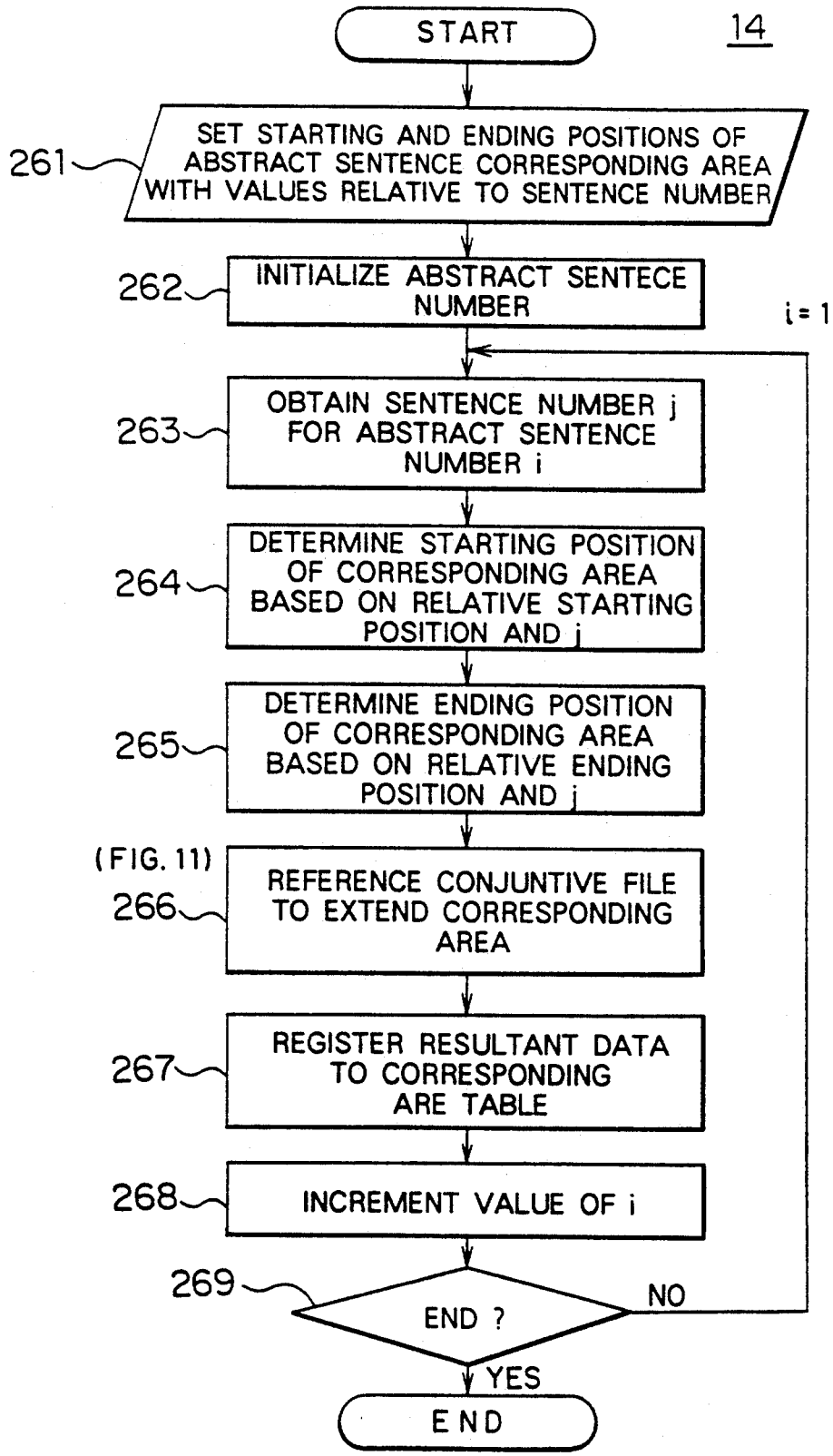
FIG. 26 is a flowchart showing the operation of another example of a corresponding area decision processing.

In the case of this variation, in the processing of the step 14 of FIG. 3, steps 261 to 269 of FIG. 26 are executed in place of the steps 91 to 99 of FIG. 10.

Namely, in the step 261, the user sets for an abstract sentence a range of sentences of the original document 60 related to the abstract sentence. The range is specified by values (sentence number differences) relatively indicating the starting and ending position of the area based on a sentence of the original document corresponding to the abstract sentence. Specifically, the relative position of the sentence of the original document 60 corresponding to an abstract sentence is set to "0". For the sentences respectively preceding and succeeding the present abstract sentence, the numbers of sentences relative thereto are counted by negative and positive values, respectively. Resultantly, the relative starting position $\alpha$ and the relative ending position $\beta$ are established for the corresponding area. The values of $\alpha$ and $\beta$ may be set in advance.

A step 262 initializes an abstract sentence number i (Ai) to "1".

The step 263 accesses the abstract sentence table 409 of FIG. 9 to obtain a sentence number in the original document j (Bj: to be called original sentence number) corresponding to the abstract sentence having an abstract sentence number i (Ai).

The step 264 sets a sentence having a sentence number (j+$\alpha$) to the starting position of the corresponding area of the abstract sentence with the abstract sentence number i (Ai).

The step 265 sets a sentence having a sentence number (j+$\beta$) to the starting position of the corresponding area of the abstract sentence assigned with the abstract sentence number i (Ai).

The step 266 references the conjunctive file 8 of FIG. 12 to extend the corresponding area. This processing is similar to the processing of the step 96 of FIG. 10. FIG. 11 concretely shows processing to be executed in the step 266.

The step 267 registers an abstract sentence and a corresponding area thereof to the corresponding area table 410 of FIG. 13.

The step 268 increments the value of the abstract sentence number i.

The step 269 checks to determine whether or not the abstract sentence number i exceeds the last abstract sentence number stored in the abstract sentence table 409. If the abstract sentence number i is found in the entries of the abstract sentence table 409, control is transferred again to the step 263; otherwise, the corresponding area determination processing is terminated.

As an alternative variation of the embodiment, the steps 11 to 13 of FIG. 3 may be replaced with a step in which the user produces and inputs abstracts in the system and a step in which the user creates the abstract sentence table 409 of FIG. 9 to input the table 409 in the system.

According to the method of and the apparatus for extracting text information in the embodiment above, for an abstract sentence which includes a complex portion or which is particularly interesting to the user, a portion of the original sentences associated therewith can be correctly displayed; moreover, a word list can be presented on the display. As a result, the user can efficiently attain the necessary and sufficient information.

In the system of the first embodiment, for an abstract sentence, original sentences associated therewith are retrieved to be presented on the display. Next, a description will be given of a second embodiment, which is a system capable of displaying, in a combination, an abstract sentence and a translated sentence related thereto.

Figure 27:
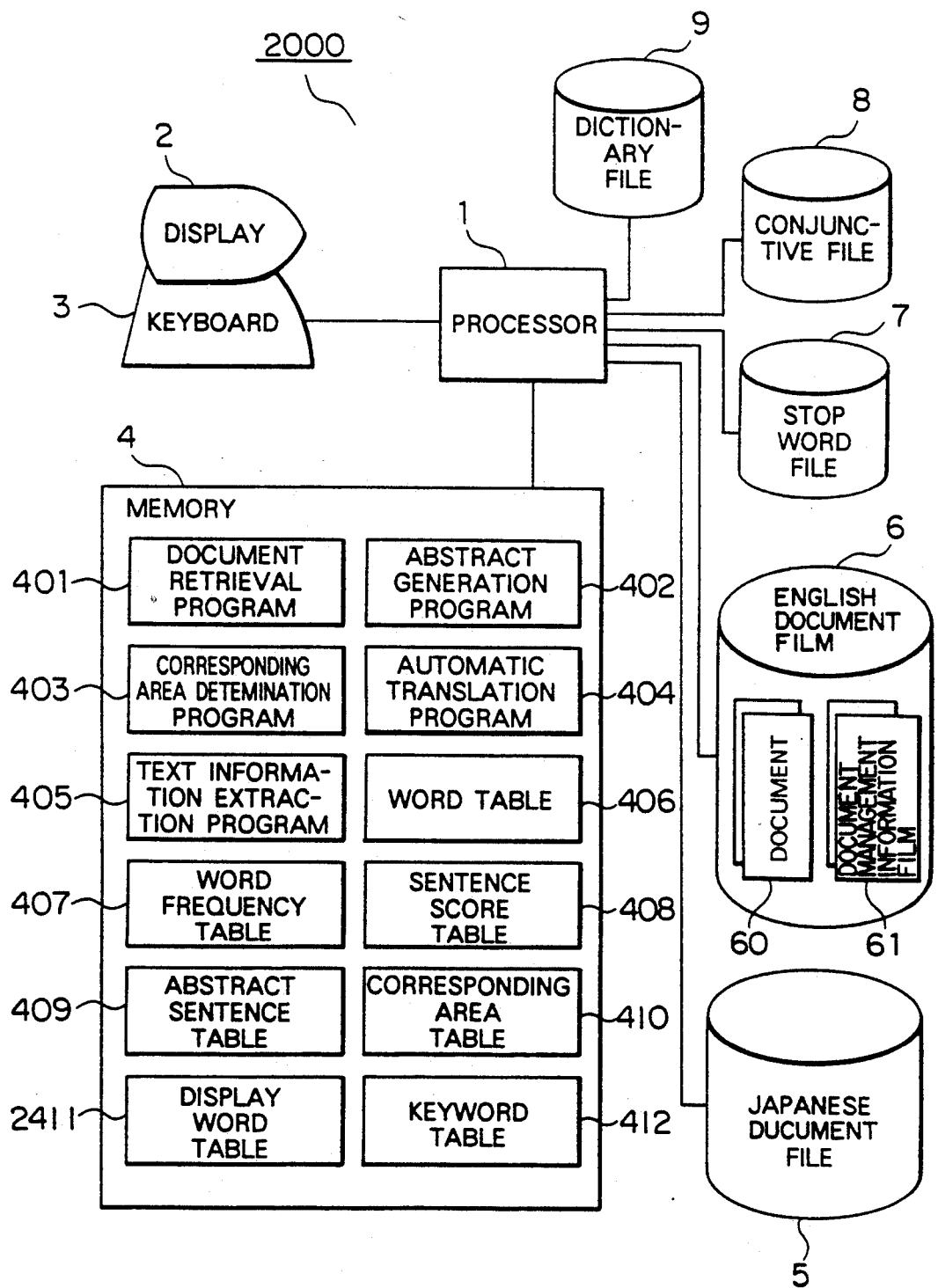
FIG. 27 is a hardware block diagram showing a second embodiment according to the present invention.

FIG. 27 is a block diagram showing the constitution of a text retrieval and display system 2000 in the second embodiment according to the present invention.

The configuration of FIG. 27 includes a processor 1, a display 2, a keyboard 3, a memory 4, a Japanese document file 5, an English document file 6, a stop word file 7, a conjunctive file 8, and a dictionary file. This constitution is implemented by adding the Japanese document file 5 to the structure of the first embodiment (FIG. 1).

In the memory 4, there are stored a document retrieval program 401, an abstract generation program 402, a corresponding area decision program 403, an automatic translation program 404, a text information extraction program 405, a word table 406, a word frequency table 407, a sentence score table 408, an abstract sentence table 409, a correspondence area table 410, a display word table 2411, and a keyword table 412. The configuration of the memory 4 is implemented by additionally disposing the automatic translation program 404 in the memory 4 of the first embodiment (FIG. 1). However, the display word table 2411 is different in the configuration from the display word table 411 (FIG. 21) of the first embodiment, which will be described later.

The English document file 6 includes at least one English document 50 and a document management information table 61 for each document. As shown in FIG. 2, the document management information table 61 is used to store therein, for each sentence of the associated document, a correspondence between a sentence number assigned thereto and a paragraph number of a paragraph containing the sentence.

Figure 28:
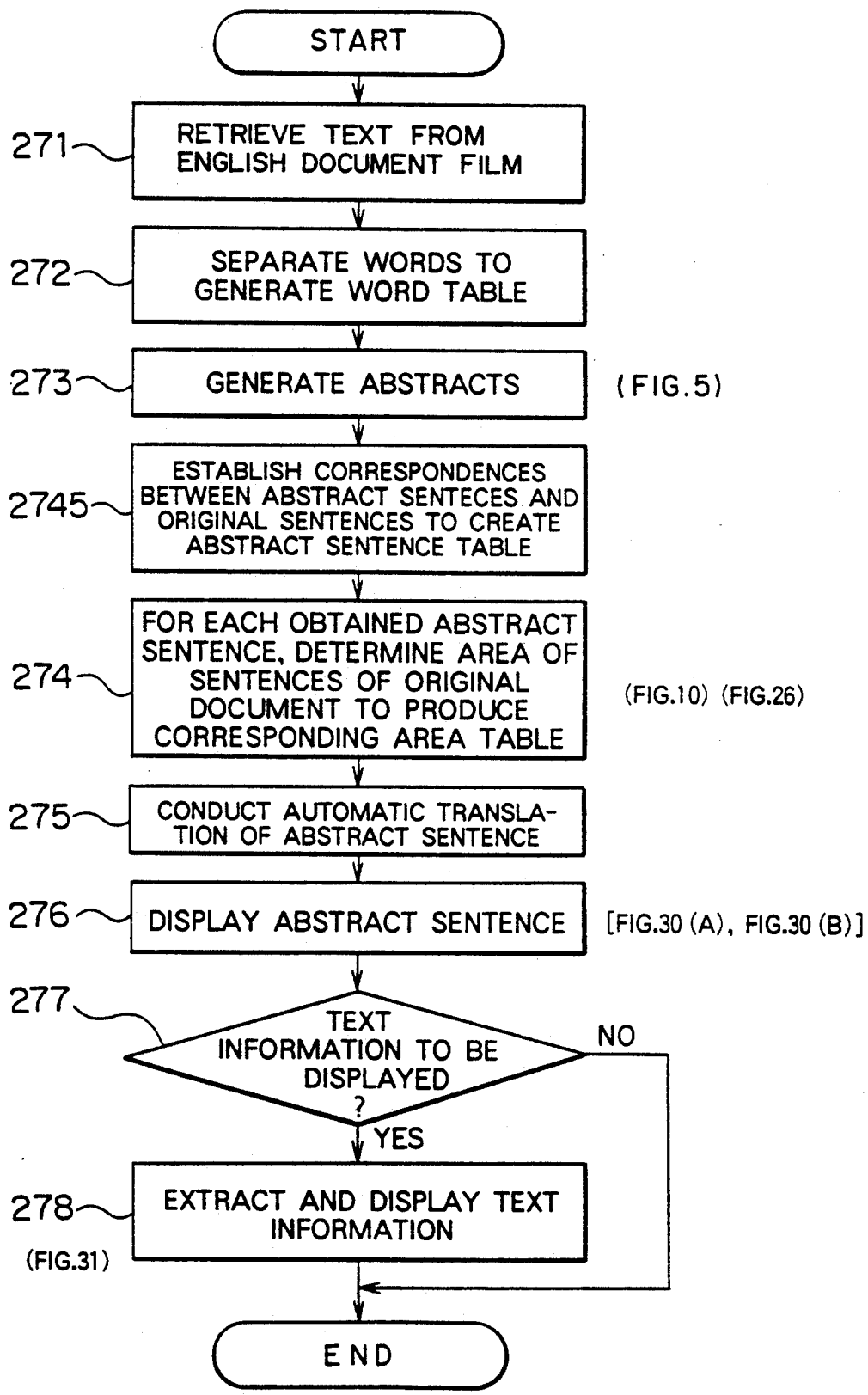
FIG. 28 is a basic flowchart showing the processing of the second embodiment according to the present invention.

FIG. 28 shows a flowchart of processing in which the text retrieval and display system 2000 retrieves a document from the English document file 6 to create and to display an abstract thereof; furthermore, the abstract is translated into Japanese such that the translated sentences are displayed together with the abstract with a correspondence established therebetween.

In a step 271 of this flowchart, a text is retrieved from the English document file 6. This processing is similar to the processing of the step 11 of FIG. 3.

In a step 272, a morphological analysis is accomplished on each sentence of the obtained document such that words constituting the sentence are loaded in the word table 406 of FIG. 4 according to an order in which the words appear in the sentence. This processing is almost the same as the processing achieved in the step 12 of FIG. 3.

A step 273 generates an abstract of the obtained document. This processing is almost identical to the processing of the step 13 of FIG. 3.

A step 2745 sequentially assigns abstract sentence numbers to the respective abstract sentences to produce the abstract sentence table 409 as shown in FIG. 9 containing the abstract sentence numbers and the associated original sentence numbers with correspondences established therebetween. The processing is similar to that of the step 13 of FIG. 3.

A step 274 determines for each abstract sentence an area of sentences existing in the original document corresponding to the abstract sentence. This processing is almost the same as that executed in the step 14 of FIG. 3.

A step 275 conducts a translation processing for the abstract sentence. The translation may be accomplished, for example, according to a translation method described in the JP-A-58-40684. The resultant translated sentence is stored in the Japanese document file 5 together with the original sentence number of the abstract sentence with a correspondence established therebetween. FIGS. 29A and 29B respectively show the data layout of the English document 60 in the English document file 6 and that of the Japanese document file 5. The data structure of the document 60 of the English document file 6 is identical to that of the document 60 shown in the lower portion of FIG. 4. The data configuration of the Japanese document file 5 is substantially the same as that of the English document file 6. The difference resides in that the Japanese texts are stored as data in the Japanese document file 5.

A step 276 displays the abstracts. In this step the user operates display language selection keys of the keyboard 3 to choose English or Japanese as a display language. For a selection of English, the English document file 6 is accessed to extract from the English document 60 sentences associated with the abstract sentence, thereby displaying the obtained sentences. FIG. 30A shows an English display screen example. If Japanese is selected, the Japanese document file 5 is accessed to extract therefrom translated abstract sentences to be displayed. FIG. 30B shows an example of the Japanese display screen.

In a step 277, the user may select whether or not the text information is displayed. The processing is almost identical to that of the step 16 of FIG. 3. If the text information is to be displayed, control is passed to a step 278; otherwise, the processing is terminated.

The step 278 extracts and then displays the text information. Referring now to the flowchart of FIG. 31, a description will be given of the text information extraction and display processing 278.

In a step 301, the user selects from the displayed abstracts an abstract sentence to obtain text information associated thereto.

A step 302 accesses the corresponding area table 410 of FIG. 13 to obtain an area of sentences corresponding to the selected abstract sentence as processing areas.

A step 303 conducts an automatic translation of the sentences in the processing areas. The translated sentences are loaded in the Japanese document file 5. Moreover, English words and their equivalents resultant from the translation processing are stored in the display word table 2411 as shown in FIG. 32. At this point of time, for each word, the frequency field is initialized to "1".

In a step 304, the user selects a processing mode. The user may select any one of the processing modes including an original sentence display processing, a keyword retrieval processing, a different document retrieval processing, an abstract sentence selection processing, and a termination. In response to the user's selection, control is transferred to either one of the steps 305 to 308 or the text information extraction and display processing is terminated.

Figure 16:
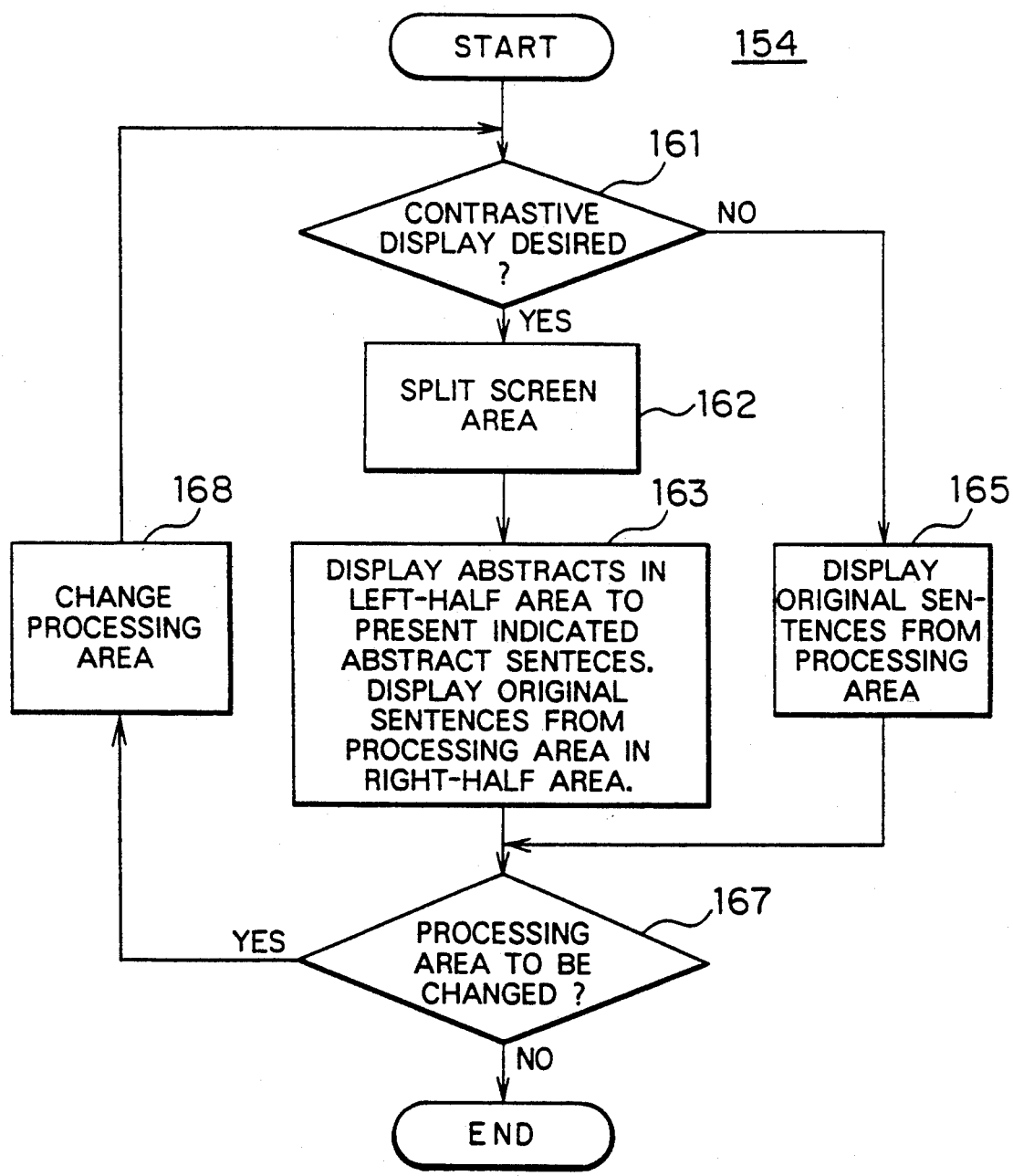
FIG. 16 is a flowchart schematically showing the operation of an original sentence display processing.

A step 305 conducts the original sentence display processing. This processing is similar to the processing already described by referring to FIG. 16. In this case, however, the user may select by the display language selection keys English or Japanese as a language to be used when the original sentences are displayed. For a selection of English, the English document 60 of the English document file 6 is accessed to extract therefrom sentences in the processing area so as to display the extracted sentences. FIG. 18 shows an example of the display image including only the sentences contained in the processing area, whereas FIG. 17 shows an example of the contrastive display including abstract sentences and sentences in the processing area. On the other hand, when Japanese is selected, the Japanese document file 5 is accessed to extract therefrom translated sentences corresponding to the processing area, thereby displaying the translated sentences. FIG. 33A shows a display example of the translated sentences associated with the processing area, whereas FIG. 33B shows an example of the contrastive display comprising the translated sentences of the abstract sentences and the translated sentences in the processing area.

Figure 34:
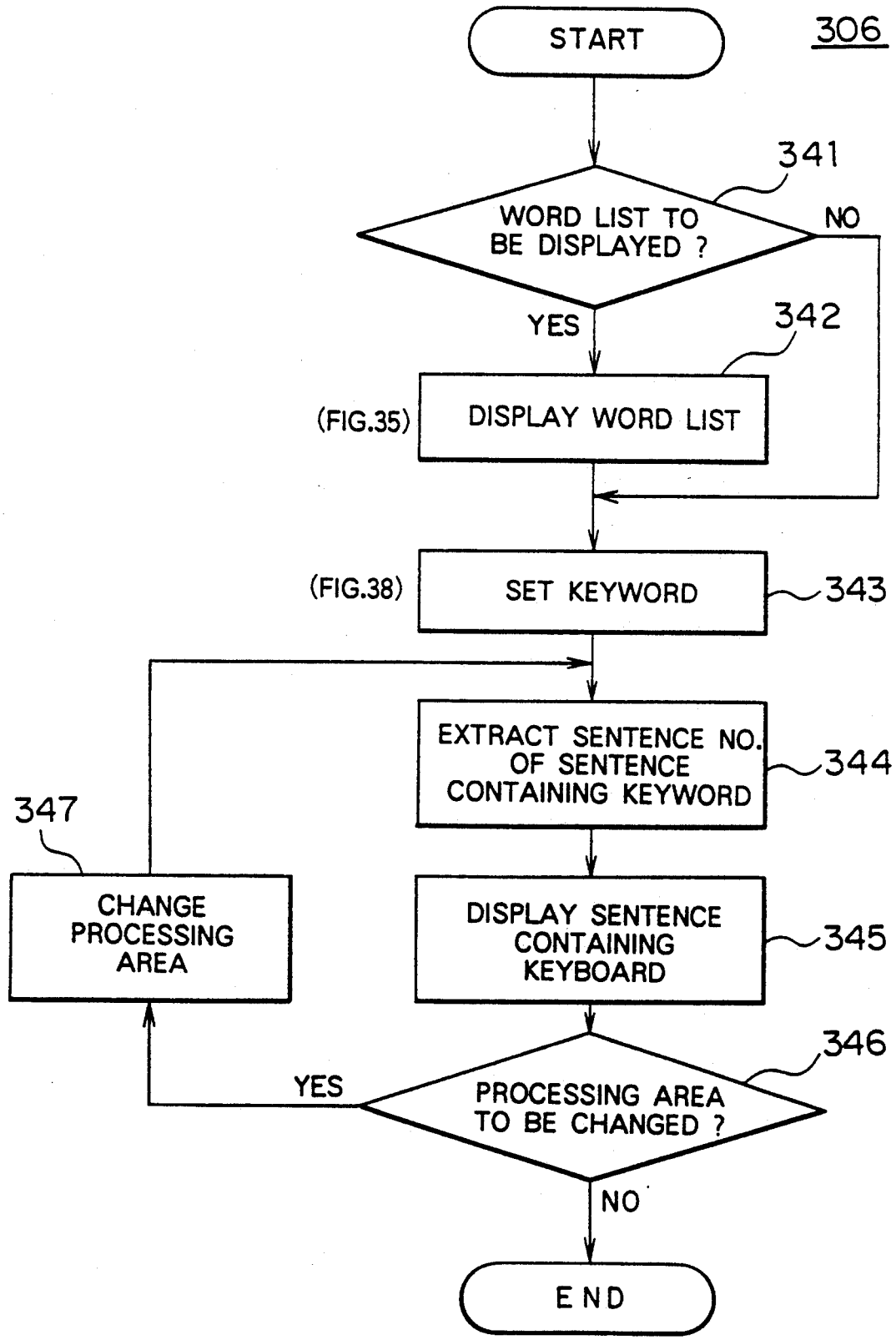
FIG. 34 is a flowchart showing the operation of a keyword retrieval processing.

A step 306 accomplishes the keyword retrieval processing. With reference to the flowchart of FIG. 34, a description will be given of the keyword retrieval processing.

In a step 341, the user chooses whether or not a word list is to be displayed so that the user references the contents thereof as candidates for keywords. If the word list is to be displayed, control is passed to a step 342; otherwise, the processing proceeds to a step 343.

The step 342 presents the word list on the display 2. The word list display processing will be described by referring to the flowchart of FIG. 35.

In a step 3501, the user selects a type of the word list to be presented. Two kinds of word lists are specificable in this system, namely, a word list ordered by frequency of words and a word list ordered in alphabetical sequence or in Japanese syllabary sequence (of Japanese 50 sounds).

Figure 31:
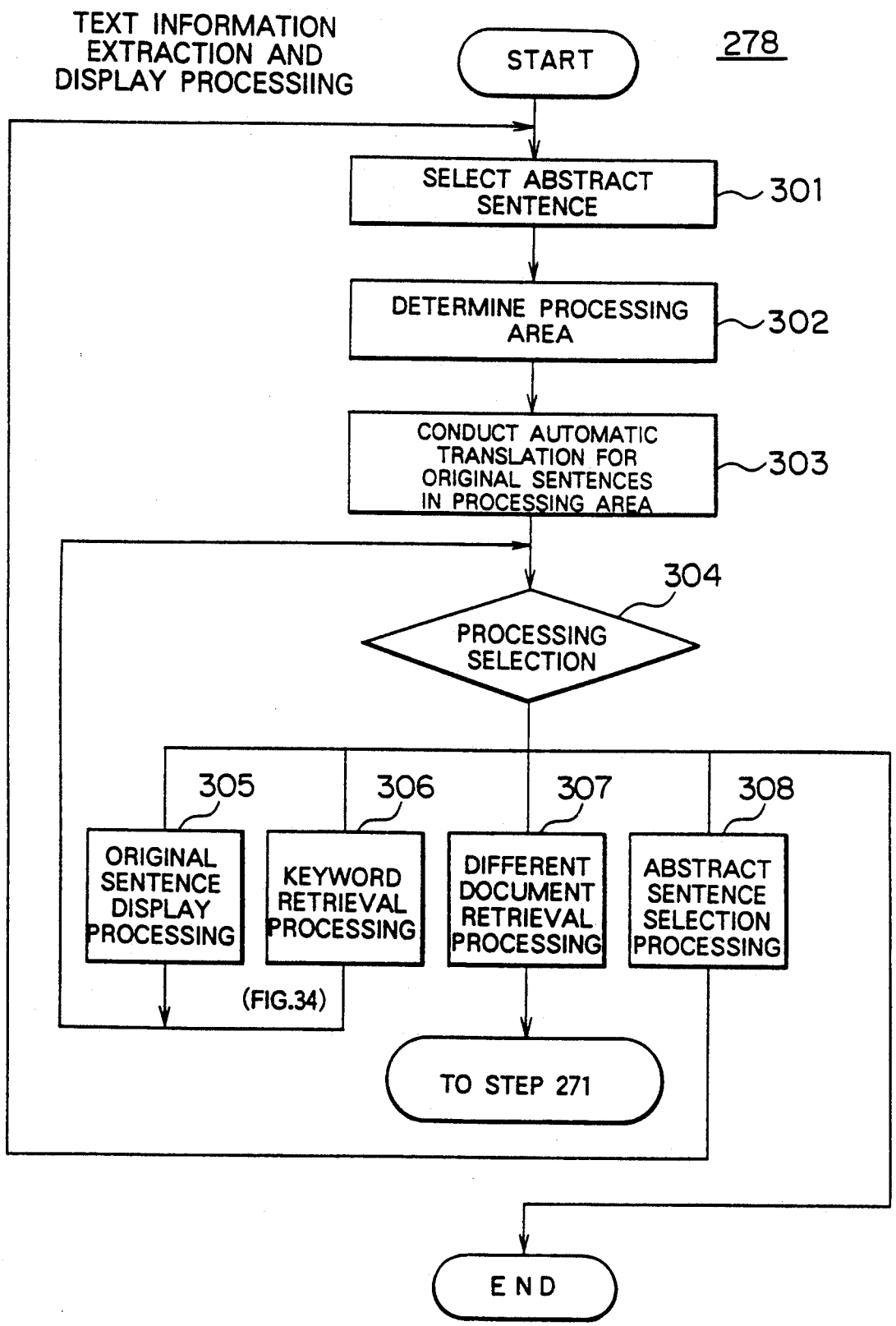
FIG. 31 is a flowchart showing the operation of a text information extraction and display processing.

A step 3502 searches the display word table 2411 of FIG. 32 created in the step 303 of FIG. 31 to attain the pair of English and their translated words (Japanese words) repeatedly found in the table. When a plurality of such word pairs are found, the system counts the number thereof and then deletes unnecessary records so as to remains one record. The obtained count value is set to the frequency field of the remaining record.

In a step 3503, the user chooses by the display language selection keys English or Japanese as the word display language. For a selection of English or Japanese, control is transferred to a step 3504 or 3508, respectively.

A step 3504 checks to determine whether or not a work list ordered by frequency has been requested in the step 3501. If this is the case, control is passed to a step 3505; otherwise, control is transferred to a step 3506.

The step 3505 sorts the English words of the display word table 2411 of FIG. 32 in the frequency order.

The step 3506 sorts the English words of the display word table 2411 of FIG. 32 in the alphabetical order.

Figure 36A:
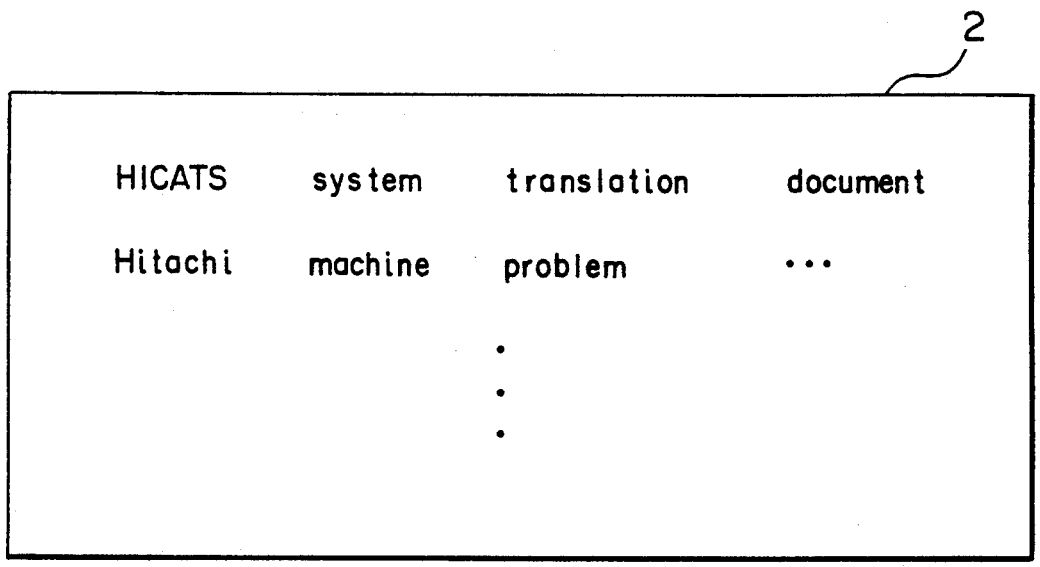
FIGS. 36A, 36B, 37A, and 37B are diagrams schematically showing display screen examples.
Figure 36B:
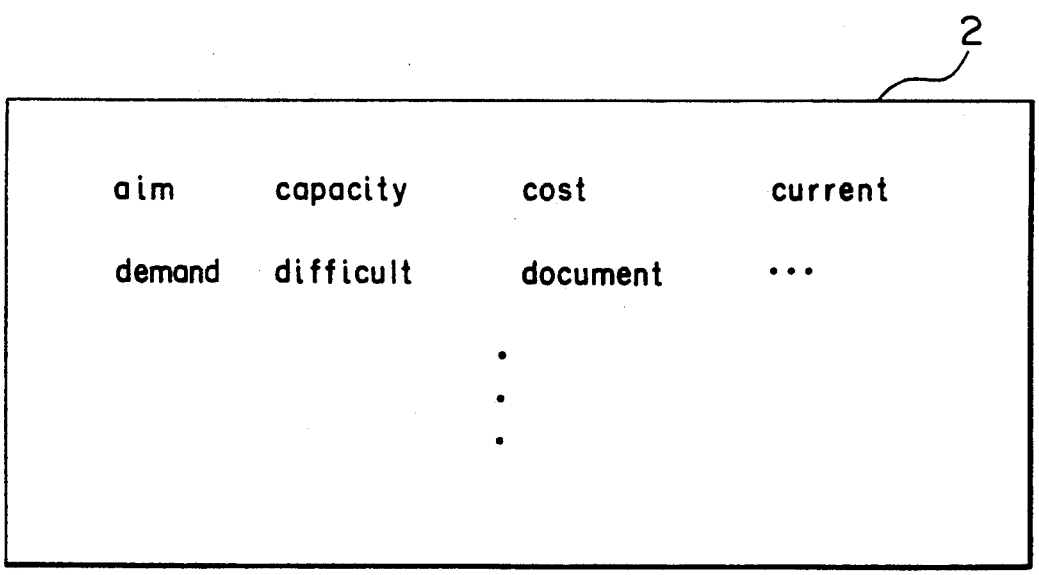

A step 3507 displays the sorted English words from the display word table 2411. FIGS. 36A and 36B respectively show examples of the word list ordered by frequency and that sorted in the alphabetical order.

On the other hand, the step 3508 checks to decide whether or not a word list ordered by frequency has been requested in the step 3501. If this is the case, control is passed to a step 3509; otherwise, control is transferred to a step 3510.

The step 3509 sorts the translated words (Japanese words) of the display word table 2411 of FIG. 32 in the frequency order.

The step 3510 sorts the translated words (Japanese words) of the display word table 2411 of FIG. 32 in the Japanese syllabary order.

Figure 37A:
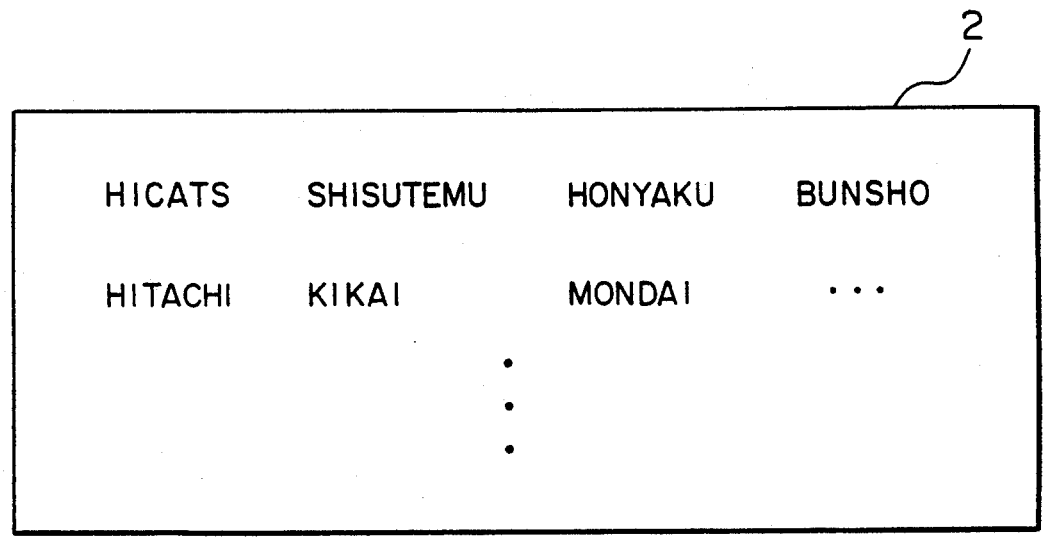
Figure 37B:
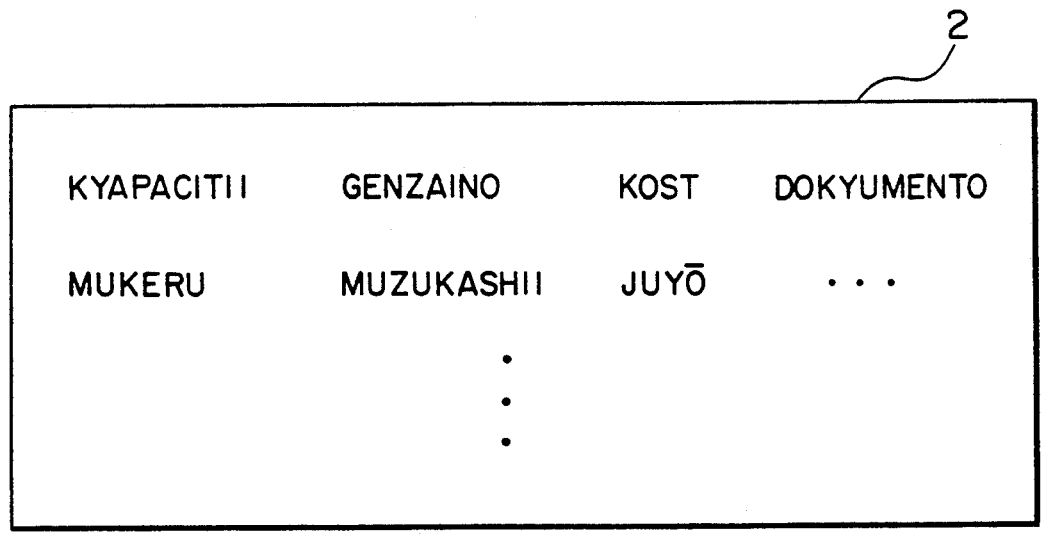

A step 3511 displays the sorted translated words from the display word table 2411. FIGS. 37A and 37B respectively show examples of the word list ordered by frequency and that sorted in the Japanese syllabary order.

Returning now to FIG. 29, a step 343 conducts a keyword setting operation. Referring now to the flowchart of FIG. 38, the keyword setting operation will be described.

In a step 381, the user is requested to input a keyword. In this input operation, the user may select either one of the English and Japanese keywords. Moreover, a plurality of keywords may be inputted.

A step 382 checks the keyword supplied from the user to determine which one of the languages is used i.e. English or Japanese. Specifically, when the keyboard 3 is employed to input the keyword, the input mode of the keyboard 3 is checked for identifying the language. On the other hand, when the user chooses the keyword from the displayed word list, the language is determined depending on the type of the word list. For a keyword in English or Japanese, control is passed to a step 383 or 384, respectively.

The step 383 stores the English keyword in the keyword table 412.

On the other hand, the step 384 searches the display word table 2411 of FIG. 32 to obtain a record having the translated word (Japanese word) identical to the Japanese keyword.

A step 385 checks to decide whether or not such a record has been found in the display table 2411. If this is the case, control is passed to a step 386; otherwise, the processing returns to the step 381 in which a keyword will be inputted again.

In a step 386, the English word of the record having the translated word identical to the Japanese keyword is stored as a keyword in the keyword table 412. If a plurality of such records are found, all English words related thereto are loaded as keywords in the keyword table 412.

Returning to FIG. 34, for each keyword thus stored in the keyword table 412, a step 344 accesses the sentences in the processing area to attain a sentence number of a sentence containing the keyword. The processing is similar to that executed in the step 194 of FIG. 19.

A step 345 reads the English documents 60 of the English document file 6 so as to extract and to display sentences each containing an associated keyword. This processing is almost the same as that achieved in the step 195 of FIG. 19.

In a step 346, the user is requested to judge for a change of the processing area. If the user specifies that the processing area is not to be changed, the keyword retrieval processing is terminated. For the processing area change, control is passed to step 347. The processing is similar to that of the step 196 of FIG. 19.

The step 347 changes the starting and ending positions of the processing area based on an instruction supplied from the user. When the processing area is changed, the starting and ending positions of the corresponding area are updated in the corresponding area table 410 of FIG. 13. Control is then passed again to the step 344.

Returning now to FIG. 31, a step 307 accomplishes the different document retrieval processing. With reference to the flowchart of FIG. 39, the different document retrieval processing will be described.

In a step 4251, the user chooses whether or not a word list is to be displayed so that the user references the word list to set a keyword. If the word list is to be displayed, control is passed to a step 4252; otherwise, control is transferred to a step 4253. This step 4251 is similar to the step 341 of FIG. 34.

Figure 35:
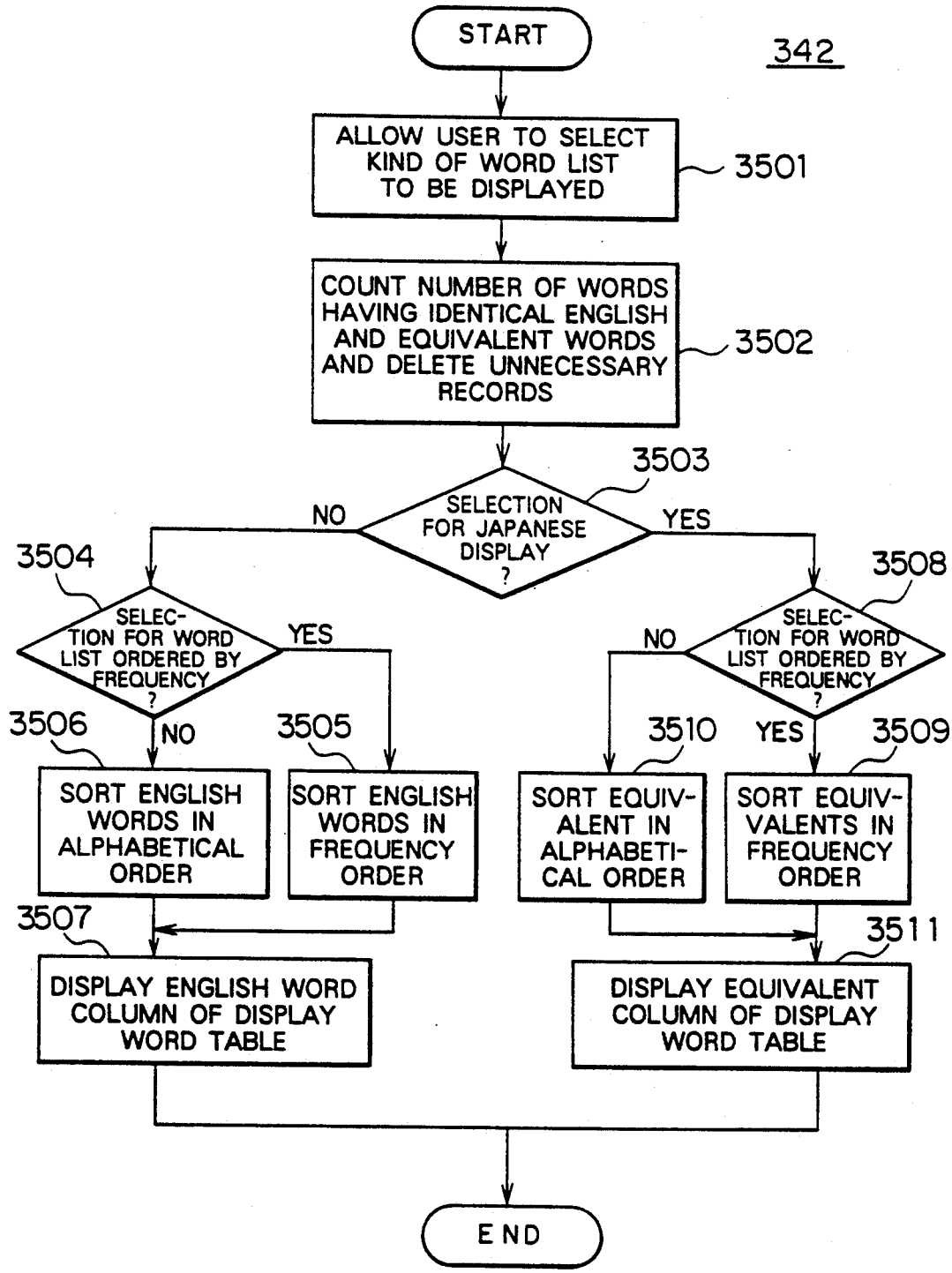
FIG. 35 is a flowchart showing the operation of a word list display processing.

A step 4252 displays the word list. The processing is achieved in a similar fashion as for the processing of the step 342 of FIG. 34. Concretely, FIG. 35 shows processing to be achieved in the step 4252.

Figure 38:
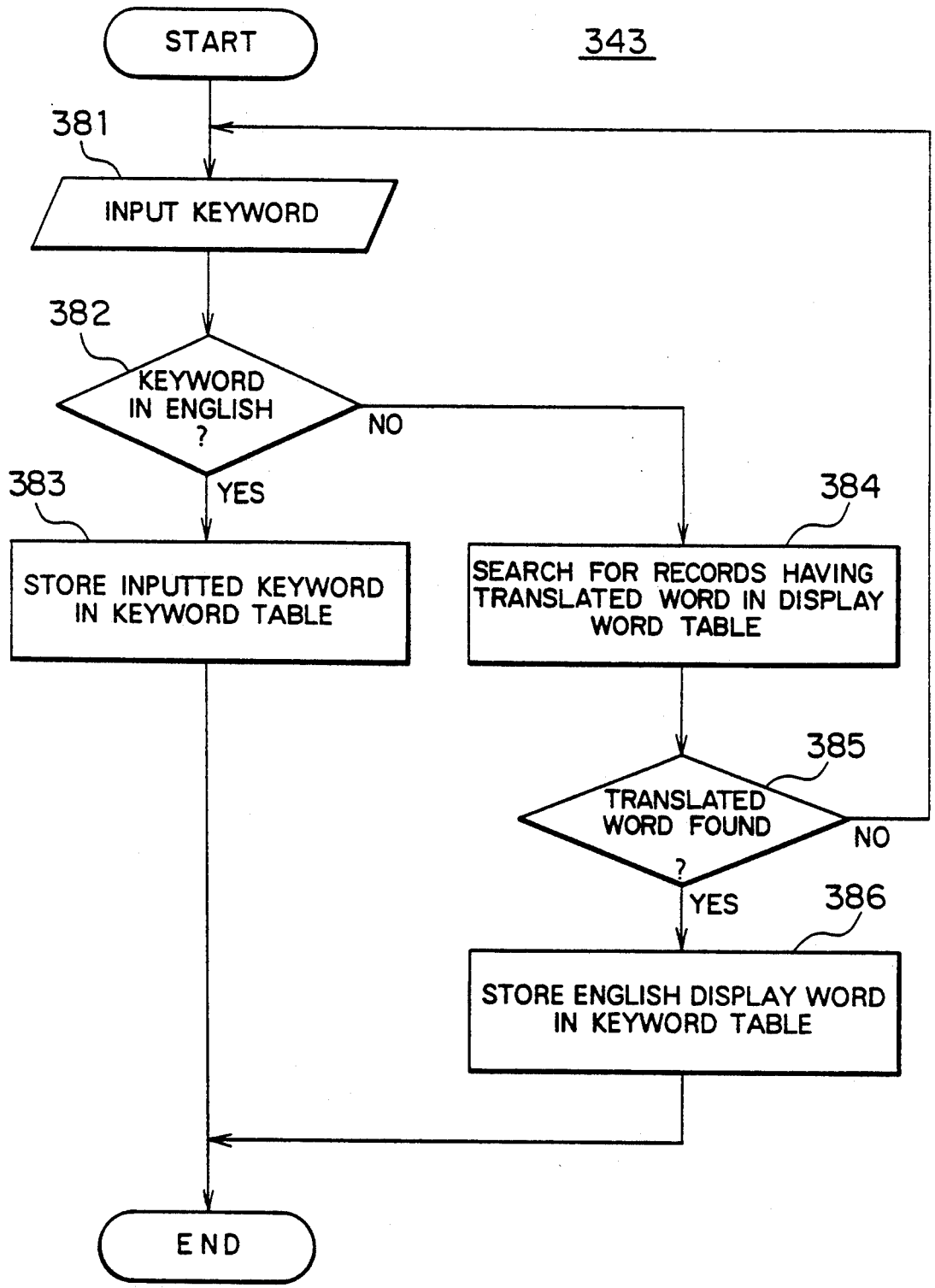
FIG. 38 is a flowchart showing the operation of a keyword setting processing.

A step 4253 conducts a keyword setting operation. This step is almost the same as the step 343 of FIG. 34. FIG. 38 specifically shows the processing of the step 4253.

Thereafter, returning to the flowchart of FIG. 31, control is then transferred to the step 271 of FIG. 28. Namely, a retrieval is conducted for a different document with a word of the keyword table 412 set as a retrieval key. Moreover, a sequence of processing from the step 272 to the step 278 is executed recursively.

Returning now to FIG. 31, the step 308 achieves the abstract sentence selection processing i.e. abstracts are displayed and then control is passed again to the step 301.

As a variation of the embodiment, the steps 271 to 2745 of FIG. 28 may be replaced, for example, with a step in which the user creates and inputs abstracts in the system and a step in which the user produces and inputs the abstract sentence table 409 of FIG. 9 in the system.

Moreover, as an alternative embodiment, the present invention may be applied to languages other than the English and Japanese.

According to the method of and the apparatus for extracting text information in accordance with the present invention, when processing texts of documents, there can be easily obtained text information of important portions of a document, a word list of words found in the essential portions, etc. based on abstracts of the documents.

We claim:

1. A method for supporting text understanding using abstract of the text with a computer system including an input unit, an output unit, and a storage, comprising the steps of:
    storing documents, abstracts, thereof, relational information indicating relationships between sentences of the abstracts and sentences of the documents, and text information related to sentences of the documents associated with sentences of the abstracts in the storage;
    choosing in response to an input from the input unit at least one of the sentences of the abstracts;
    extracting from the documents, based on the relational information, sentences of the documents associated with the chosen one abstract sentence;
    obtaining the text information related to the extracted sentences of the documents associated with the chosen one abstract sentence; and
    outputting the obtained text information to the output unit.

2. A method according to claim 1, wherein said storing step includes the steps of:
    storing relational information of a one-to-one correspondence established between a sentence of the documents and a sentence of the abstracts;
    attaining, based on the one-to-one correspondence information, a sentence from the documents corresponding to an abstract sentence;
    determining as the sentences of the documents associated with the sentence of the abstract, a plurality of sentences of the document including the attained sentence; and
    storing, as the relational information, the sentence of the abstracts and an area of the sentences of the documents associated with the sentence of the abstract.

3. A method according to claim 2, wherein said step of determining the sentences of the documents associated with the sentence of the abstract, determines all sentences contained in a paragraph of the document including the sentence thus obtained from the documents as the sentences of the document associated with the sentence of the abstract.

4. A method according to claim 2, wherein said step of determining the sentences of the documents associated with the sentence of the abstract, determines sentences contained in an area of sentences in the document ranging from a sentence preceding an obtained sentence by a first predetermined number of sentences to a sentence succeeding the obtained sentence by a second predetermined number of sentences, as the sentences of the documents associated with the sentence of the abstract.

5. A method according to claim 2, wherein said step of determining the sentences of the documents associated with the sentence of the abstract, extends, when a predetermined phrase is included in a first sentence or a last sentence of the sentences of the document, the area of the sentences of the documents depending on the predetermined phrase in a forward direction or in a backward direction of the area, thereby determining sentences contained in an extended area as the sentences of the documents associated with the sentence of the abstract.

6. A method according to claim 2, further comprising the step of:
    changing an area of the sentences of the documents associated with the sentence of the abstract depending on a change instruction supplied by a user from the input unit based on the sentences of the documents associated with the sentence of the abstract thus outputted.

7. A method according to claim 1, further comprising the steps of:
    generating abstracts of the documents; and
    producing, based on information obtained in a process of generating the abstracts, relational information indicating relationships between a sentence of the abstract and sentences of the documents.

8. A method according to claim 1, further comprising the steps of:
    inputting from the input unit document selection information for choosing a document from at least one document;
    choosing the document in response to the document selection information;
    generating an abstract of the chosen document; and
    producing, based on information obtained in a process of generating the abstract, relational information indicating relationships between a sentence of the abstract and sentences in the document.

9. A method according to claim 8, wherein said step of generating an abstract of the document utilizes the document selection information when key words are used as the document selection information.

10. A method according to claim 1, wherein said text information related to the sentences of the documents associated with the sentence of the abstract, is the sentences of the documents associated with the sentence of the abstract themselves.

11. A method according to claim 8, further comprising the steps of:
inputting from the input unit document selection information for a different document different from a pertinent document;
choosing the different document in response to the document selection information;
generating an abstract of the chosen different document; and
producing, based on information obtained in a process of generating the abstract, relational information indicating relationships between a sentence of the abstract and sentences in the different document.

12. A method according to claim 1, further including the steps of:
outputting a plurality of kinds of text information related to the sentences of the documents associated with the sentence of the abstract; and
selecting at least one of said plurality of kinds of text information, based on an instruction supplied by a user from the input unit.

13. A method according to claim 1, wherein the text information related to the sentences of the documents associated with the sentence of the abstract includes a list of words appearing in the area of the sentences of the documents associated with the sentence of the abstract.

14. A method according to claim 1, wherein each of the sentences of the abstracts is a first sentence of each paragraph of the documents.

15. An apparatus for supporting text understanding using abstract of the text, comprising:
a storage for storing documents, abstracts thereof, relational information indicating relationships between sentences of the abstracts and sentences of the documents, and text information related to sentences of the documents associated with a sentence of the abstracts;
an output unit for outputting the abstracts stored in said storage;
an input unit adapted for receiving a user specified at least one of the sentences of the abstracts from said output unit;
means for extracting from the documents, based on the relational information, sentences of the documents associated with the at least one abstract sentence; and
means for obtaining text information related to extracted sentences of the documents associated with the at least one abstract sentence.

16. An apparatus according to claim 15, wherein said storage includes:
means for storing relational information of a one-to-one correspondence established between a sentence of the documents and a sentence of the abstracts;
means for attaining, based on the one-to-one correspondence information stored by said store means, a sentence from the documents corresponding to the abstract sentence;
means for determining, as sentences of the documents associated with the sentence of the abstracts, a plurality of sentences from the documents including a sentence attained from the means for attaining; and
means for storing, as the relational information, relationships between the sentences of the abstracts and sentences in an area of the sentences of the documents associated with sentences of the abstracts.

17. An apparatus according to claim 15, wherein said output unit includes means for outputting concurrently to the output unit the abstract sentences and the sentences of the documents associated with the abstract sentence.

* * * * *

UNITED STATES PATENT AND TRADEMARK OFFICE
CERTIFICATE OF CORRECTION

PATENT NO. : 5,297,027
DATED : March 22, 1994
INVENTOR(S) : Yasutsugu Morimoto, et al.

It is certified that error appears in the above-indentified patent and that said Letters Patent is hereby corrected as shown below:

Title Page: and column 1, line 1-4, the title of this invention should read:
[54] METHOD AND APPARATUS FOR PROMOTING THE UNDERSTANDING OF A TEXT BY USING AN ABSTRACT OF THAT TEXT In the Claims:

Claim 1, column 15, line 45, after "abstracts" delete " , ".

Signed and Sealed this

Fifth Day of July, 1994

*Attest:*

BRUCE LEHMAN

*Attesting Officer*     *Commissioner of Patents and Trademarks*